(12) United States Patent
Connolly et al.

(10) Patent No.: US 10,949,233 B2
(45) Date of Patent: Mar. 16, 2021

(54) OPTIMIZED VIRTUAL NETWORK FUNCTION SERVICE CHAINING WITH HARDWARE ACCELERATION

(71) Applicant: Ciena Corporation, Hanover, MD (US)

(72) Inventors: Matthew W. Connolly, Alpharetta, GA (US); Aung Htay, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 256 days.

(21) Appl. No.: 15/189,153

(22) Filed: Jun. 22, 2016

(65) Prior Publication Data

US 2017/0371692 A1 Dec. 28, 2017

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ....... G06F 9/45558; G06F 2009/45595; G06F 2009/4557
See application file for complete search history.

(56) References Cited

U.S. PATENT DOCUMENTS

| 8,223,779 | B2 | 7/2012 | Carroll et al. | |
| 8,559,812 | B2 | 10/2013 | Oltman et al. | |
| 9,692,712 | B2 * | 6/2017 | Robitaille | H04L 47/825 |
| 9,979,602 | B1 * | 5/2018 | Chinnakannan | H04L 47/82 |
| 10,291,543 | B1 * | 5/2019 | Felstaine | H04L 47/762 |
| 2014/0177450 | A1 | 6/2014 | Chou et al. | |
| 2015/0063800 | A1 | 3/2015 | Htay et al. | |
| 2015/0127805 | A1 | 5/2015 | Htay et al. | |
| 2015/0271043 | A1 | 9/2015 | Htay et al. | |
| 2016/0006696 | A1 * | 1/2016 | Donley | H04L 63/0236 709/223 |
| 2016/0043944 | A1 * | 2/2016 | Felstaine | H04L 45/70 370/389 |
| 2016/0277509 | A1 * | 9/2016 | Qiang | H04L 67/16 |
| 2016/0328252 | A1 * | 11/2016 | Singh | G06F 9/45558 |
| 2017/0039089 | A1 * | 2/2017 | Xia | G06F 9/4555 |
| 2017/0104679 | A1 * | 4/2017 | Sunavala | H04L 45/306 |
| 2017/0177396 | A1 * | 6/2017 | Palermo | H04L 49/70 |

(Continued)

OTHER PUBLICATIONS

Bronstein et al—Uniform Handling and Abstraction of NFV Hardware Accelerators—IEEE Network May 2015 (Year: 2015).*

(Continued)

*Primary Examiner* — Lewis A Bullock, Jr.
*Assistant Examiner* — Kevin X Lu
(74) *Attorney, Agent, or Firm* — Clements Bernard Walker; Lawrence A. Baratta, Jr.; Christopher L. Bernard

(57) ABSTRACT

Systems and methods for Virtual Network Function (VNF) service chain optimization include, responsive to a request, determining placement for one or more VNFs in a VNF service chain based on a lowest cost determination; configuring at least one programmable region of acceleration hardware for at least one VNF of the one or more VNFs; and activating the VNF service chain. The lowest cost determination can be based on a service chain cost model that assigns costs based on connectivity between switching elements and between hops between sites. The activating can include a Make-Before-Break (MBB) operation in a network to minimize service interruption of the VNF service chain.

17 Claims, 16 Drawing Sheets

(56) References Cited

U.S. PATENT DOCUMENTS

2017/0286142 A1* 10/2017 Palermo .............. G06F 9/45558
2017/0289270 A1* 10/2017 Li ....................... H04W 64/006

OTHER PUBLICATIONS

Mehmet Ersue; ETSI NFV MANO WG Co-chair; ETSI NFV Management and Orchestration—An Overview; IETF 088, Vancouver, Canada; pp. 1-14.

Vivien Yang et al.; IDF15; Enabling Deployment of Software Defined Networks and Network Function Virtualization in 2015; DATS003; Intel; pp. 1-48.

Fei Chen et al.; Enabling FPGAs in the Cloud; The work is supported by IBM, National Natural Science Foundation of China (No. 61373026), and Tsinghua University Initiative Scientific Research Program; pp. 1-10.

Stuart A. Byma et al.; Virtualizing FPGAs for Cloud Computing Applications; Copyright 2014 by Stuart A. Byma; pp. 1-85.

MEF Service Operations Specification MEF 55; Lifecycle Service Orchestration (LSO): Reference Architecture and Framework; Mar. 2016; The MEF Forum 2016; pp. 1-57.

* cited by examiner

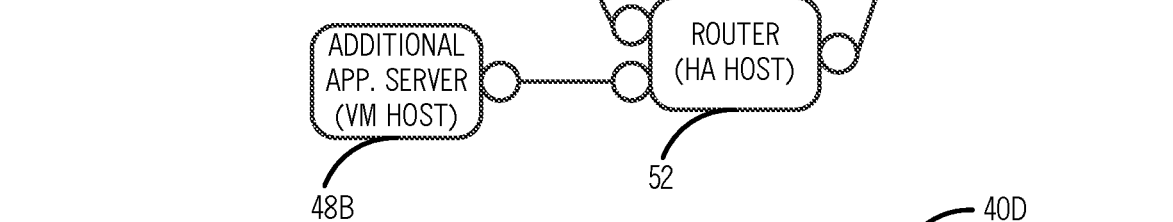

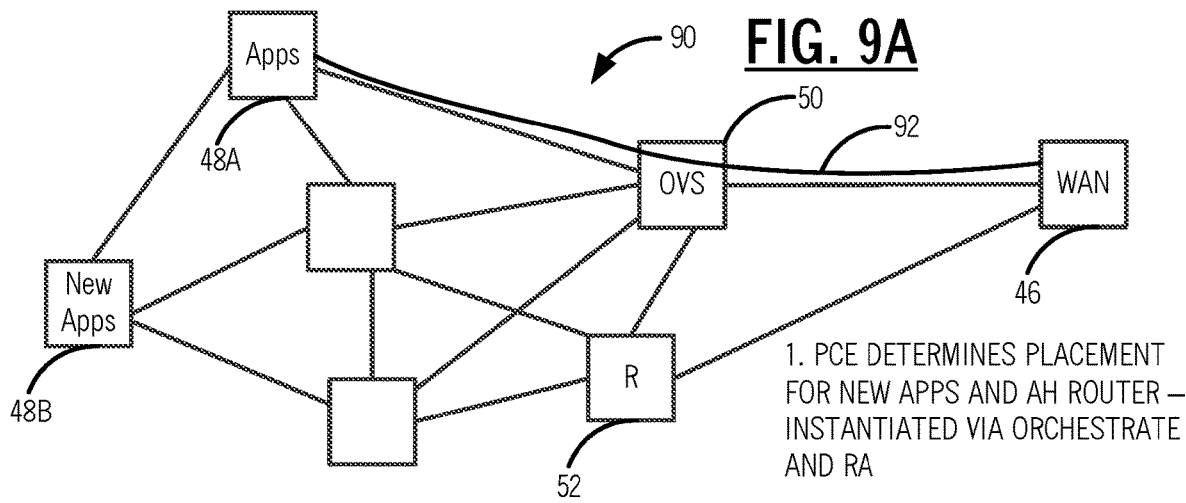
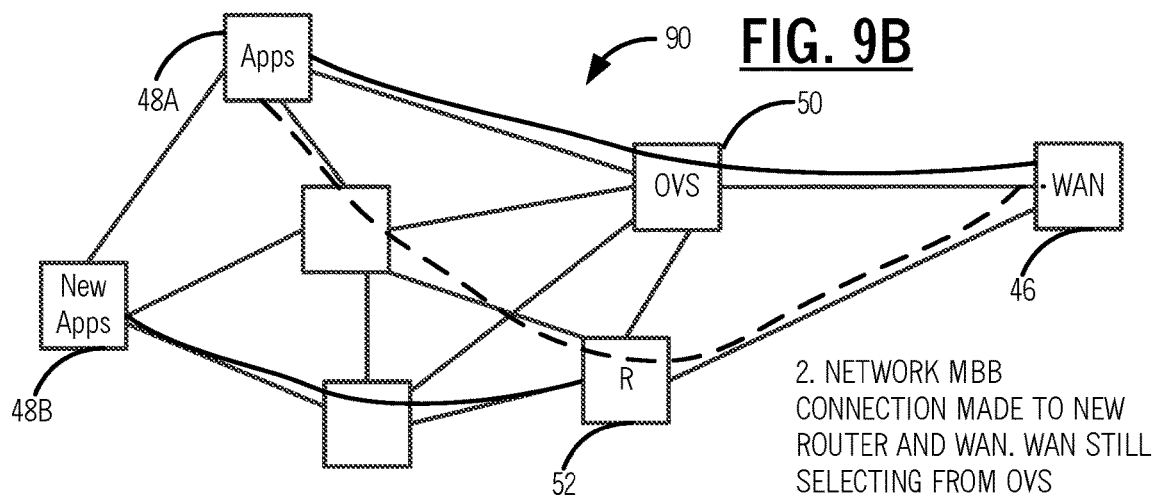
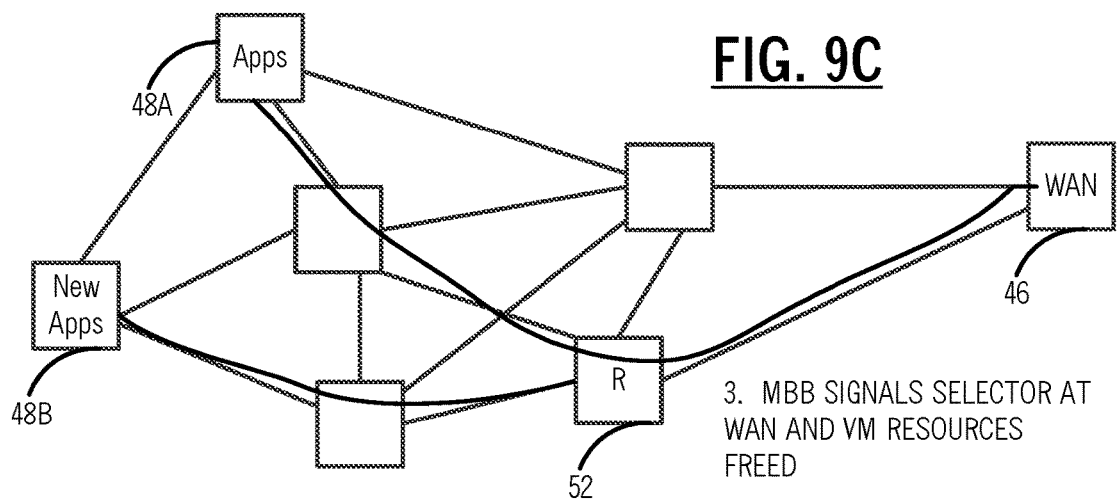

OPTIMIZED VIRTUAL NETWORK FUNCTION SERVICE CHAINING WITH HARDWARE ACCELERATION

FIELD OF THE DISCLOSURE

The present disclosure generally relates to networking systems and methods. More particularly, the present disclosure relates to optimized Virtual Network Function (VNF) service chaining with hardware acceleration.

BACKGROUND OF THE DISCLOSURE

Network Functions Virtualization (NFV) is a network architecture concept that uses virtualization to virtualize entire classes of network node functions into building blocks that may connect, or chain together, to create network services. A Virtualized Network Function (VNF) may include one or more Virtual Machines (VMs) running different software and processes, on top of standard high-volume servers, switches and storage, or even cloud computing infrastructure, instead of having custom hardware appliances for each network function. For example, a virtual session border controller could be deployed to protect a network without the typical cost and complexity of obtaining and installing physical units. Other examples of NFV include virtualized load balancers, firewalls, Domain Name Servers (DNS), intrusion detection devices and Wide Area Network (WAN) accelerators. The NFV framework can be conceptualized with three components generally, namely VNFs, Network Functions Virtualization Infrastructure (NFVI), and Network Functions Virtualization Management and Orchestration Architectural framework (NFV-MANO). Again, VNFs are software implementations of network functions that can be deployed on the NFVI. The NFVI is the totality of all hardware and software components that build the environment where VNFs are deployed. The NFVI can span several locations and the network providing connectivity between these locations is considered as part of the NFVI. The NFV-MANO is the collection of all functional blocks, data repositories used by these blocks, and reference points and interfaces through which these functional blocks exchange information for the purpose of managing and orchestrating NFVI and VNFs.

Conventionally, a firmware configuration would be static with respect to VNF placement, i.e., a static equipment or network resource. Some recent work in NFV has looked into hardware acceleration and in some recent work, hybrid scenarios have been considered. However, the area of dynamic service chaining has not been addressed. Service chaining is used to build more complex network services where multiple VNFs are used in sequence to deliver a network service. As such, conventional approaches treat firmware installation on computing equipment such as Field Programmable Gate Arrays (FPGAs) as part of an equipment configured and once installed, it is advertised as a static resource. Conventional approaches do not address the orchestration and optimization of combined NFV and programmable hardware accelerator/Programmable Region (PR) service chains. Conventional approaches do not optimize hardware acceleration placement relative to other elements in the service chain in a dynamic manner. Accordingly, the conventional approaches are less optimal with respect to resource usage and latency, i.e., they just make do with the static equipment resources, and will potentially suffer worse latency and throughput. Thus, conventional approaches do not provide an ability to migrate from VM-based NFV to Hardware Acceleration (HA)-based NFV with minimal service disruption. Usually, a service downtime is expected with service chain reconfiguration, even more-so when HA elements change.

BRIEF SUMMARY OF THE DISCLOSURE

In an exemplary embodiment, a method for Virtual Network Function (VNF) service chain optimization includes, responsive to a request, determining placement for one or more VNFs in a VNF service chain based on a lowest cost determination; responsive to the determining, configuring at least one programmable region of acceleration hardware for at least one VNF of the one or more VNFs; and activating the VNF service chain. The lowest cost determination is based on a service chain cost model that assigns costs based on connectivity between switching elements and based on a number of hops. The activating can include a Make-Before-Break (MBB) operation in a network to minimize service interruption of the VNF service chain. The method can further include, prior to the request, onboarding resources in an orchestrator via a resource adapter, wherein the resources can include a firmware load, the acceleration hardware, and the at least one programmable region. The request can be based on one of crossing a bandwidth threshold, a new service, a failure of a VNF in the VNF service chain, additional applications in the VNF service chain, and additional VNFs in the VNF service chain. The request can be based on monitoring analytics and performance monitoring where the VNF service chain exists to determine optimization is required. The request can be to move the at least one VNF from a Virtual Machine (VM) to the at least one programmable region of acceleration hardware. The configuring can include programming the at least one programmable region for any functionality including packet processing, hardware encryption, Layer 1 framing/muxing, Layer 2 switching, Layer 3 routing, Layer 1 to Layer 2 adaptation, hardware firewall, load balancing, and Layer 1 Forward Error Correction.

In another exemplary embodiment, an apparatus for Virtual Network Function (VNF) service chain optimization includes circuitry adapted to determine placement for one or more VNFs in a VNF service chain based on a lowest cost determination responsive to a request; circuitry adapted to configure at least one programmable region of acceleration hardware for at least one VNF of the one or more VNFs responsive to the determined placement; and circuitry adapted to cause activation of the VNF service chain. The lowest cost determination can be based on a service chain cost model that assigns costs based on connectivity between switching elements and based on a number of hops. The activation can include a Make-Before-Break (MBB) operation in a network to minimize service interruption of the VNF service chain. The request can be based on one of crossing a bandwidth threshold, a new service, a failure of a VNF in the VNF service chain, additional applications in the VNF service chain, and additional VNFs in the VNF service chain. The request can be based on monitoring analytics and performance monitoring where the VNF service chain exists to determine optimization is required. The request can be to move the at least one VNF from a Virtual Machine (VM) to the at least one programmable region of acceleration hardware. The circuitry adapted to configure can include programming the at least one programmable region for any functionality including packet processing, hardware encryption, Layer 1 framing/muxing, Layer 2 switching, Layer 3 routing, Layer 1 to Layer 2 adaptation, hardware firewall, load balancing, and Layer 1 Forward Error Correction.

In a further exemplary embodiment, a server adapted for Virtual Network Function (VNF) service chain optimization a network interface and a processor; and memory storing instructions that, when executed, cause the processor to, responsive to a request, determine placement for one or more VNFs in a VNF service chain based on a lowest cost determination, responsive to the determined placement, configure at least one programmable region of acceleration hardware for at least one VNF of the one or more VNFs, and activate the VNF service chain. The lowest cost determination can be based on a service chain cost model that assigns costs based on connectivity between switching elements and based on a number of hops. The VNF service chain can be activated by a Make-Before-Break (MBB) operation in a network to minimize service interruption of the VNF service chain. The request can be based on one of crossing a bandwidth threshold, a new service, a failure of a VNF in the VNF service chain, additional applications in the VNF service chain, and additional VNFs in the VNF service chain. The at least one programmable region can be configured for any functionality including packet processing, hardware encryption, Layer 1 framing/muxing, Layer 2 switching, Layer 3 routing, Layer 1 to Layer 2 adaptation, hardware firewall, load balancing, and Layer 1 Forward Error Correction.

BRIEF DESCRIPTION OF THE DRAWINGS

The present disclosure is illustrated and described herein with reference to the various drawings, in which like reference numbers are used to denote like system components/ method steps, as appropriate, and in which:

FIGS. 9A, 9B, and 9C are network diagrams of a network for implementing the hybrid service chain and the implementation;

DETAILED DESCRIPTION OF THE DISCLOSURE

Again, in various exemplary embodiments, the present disclosure relates to optimized Virtual Network Function (VNF) service chaining with hardware acceleration. Systems and methods of service chain optimization take into account both Hardware Acceleration (HA) elements with Partial Reconfiguration (PR) and VM elements, where the PR regions are managed as hosts for NFV. The systems and methods include a resource model to orchestrate HA and PR instances in the network along with the use of least cost algorithms to optimize pooling of HA and VM resources and service chaining across switching elements. VNF service chain optimization can be triggered based on Service Layer Agreements (SLAs), analytics, performance monitoring, etc. This triggering can be used to trigger migration to/from Pure VM Resources↔Hybrid HA/VM Resources↔Pure HA Resources. The systems and methods further include adding and removing service chain elements while minimizing service disruption, migrating between VM and HA resources while minimizing service disruption. The systems and methods can further include defragmentation of the VNF graph subsequent to changes, resource availability, and/or status changes.

VNF Hardware

Figure 1:
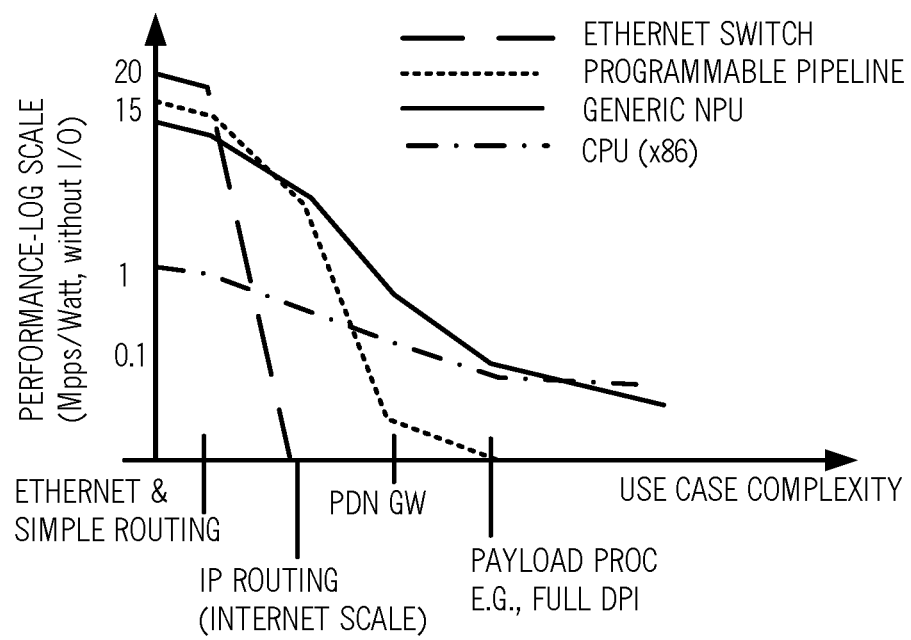
FIG. 1 is a graph of performance on a log scale versus use case complexity for various hardware embodiments of VNFs.

Referring to FIG. 1, in an exemplary embodiment, a graph illustrates performance on a log scale versus use case complexity for various hardware embodiments of VNFs. Performance is shown as Million Packets Per Second (Mpps) divided by power (Watts) without considering Input/ Output (I/O). In SDN NFV, VNFs are typically expected to run on virtual machine (VM) instances on physical network elements with compute resources, i.e., typically servers with general purpose processors (GPPs) and network adapters. The graph in FIG. 1 illustrates four hardware exemplary embodiments, namely a physical Ethernet switch, a programmable pipeline, a generic Network Processor Unit (NPU), and a Central Processing Unit (e.g., an x86). The four hardware embodiments are shown for four exemplary use cases, namely Ethernet switching and simply routing, Internet Protocol (IP) routing (at Internet scale), a Packet Data Network (PDN) Gateway (GW), and payload processing (e.g., full Deep Packet Inspection (DPI)). The programmable pipeline includes compute resources with hardware acceleration such as via Field Programmable Gate Arrays (FPGAs). The programmable pipeline can be used in cloud computing and NFV and as shown in FIG. 1, there are many cases where the programmable pipeline easily outperforms VMs, while still gaining the benefits of system virtualization.

For certain applications, VM-based VNFs are very expensive (power/performance) relative to hardware based solution; for example, line rate processing of lower network layers (1, 2, and 3), line rate encryption, etc. For routing and switching, there are scaling advantages using a soft switch distributed over multiple VMs (e.g., Open vSwitch). The disadvantages are: 1.) The increased Watt/Mbps using VMs on General Purpose Processors (GPPs), and 2.) The fact that traffic policing and shaping is limited to the level of the individual VM interfaces, making traffic engineering across VM clusters difficult. In other cases, GPP stand-alone VM solutions do well; for example: deep packet inspection and analytics. Also, GPP resources are obviously required for application layer servers.

Figure 2:
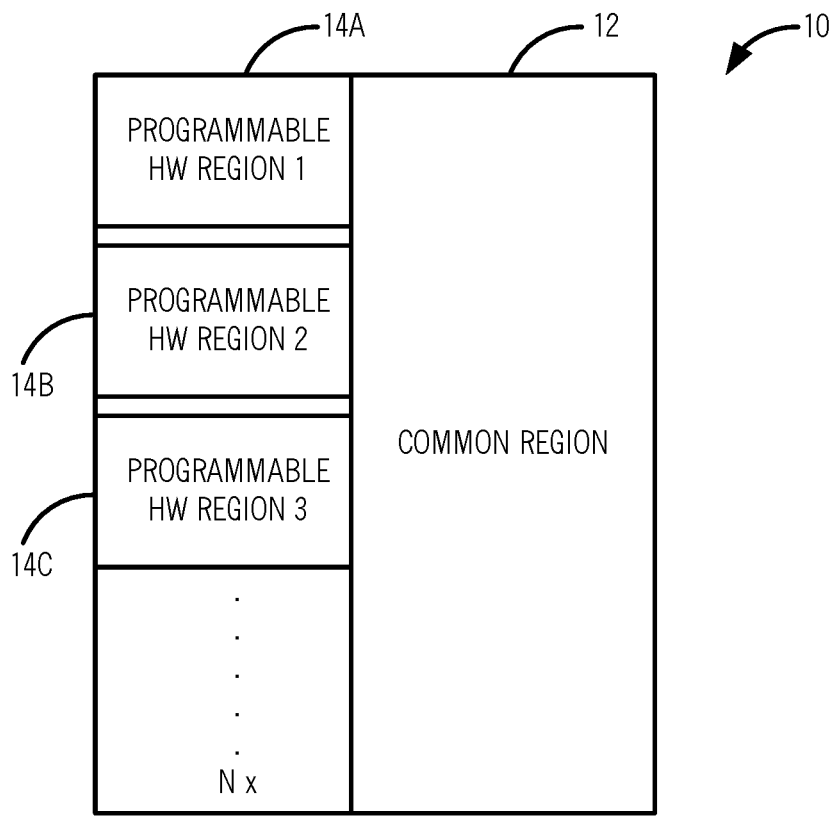
FIG. 2 is a block diagram of a programmable compute device with programmable hardware for executing VNFs.
Figure 3:
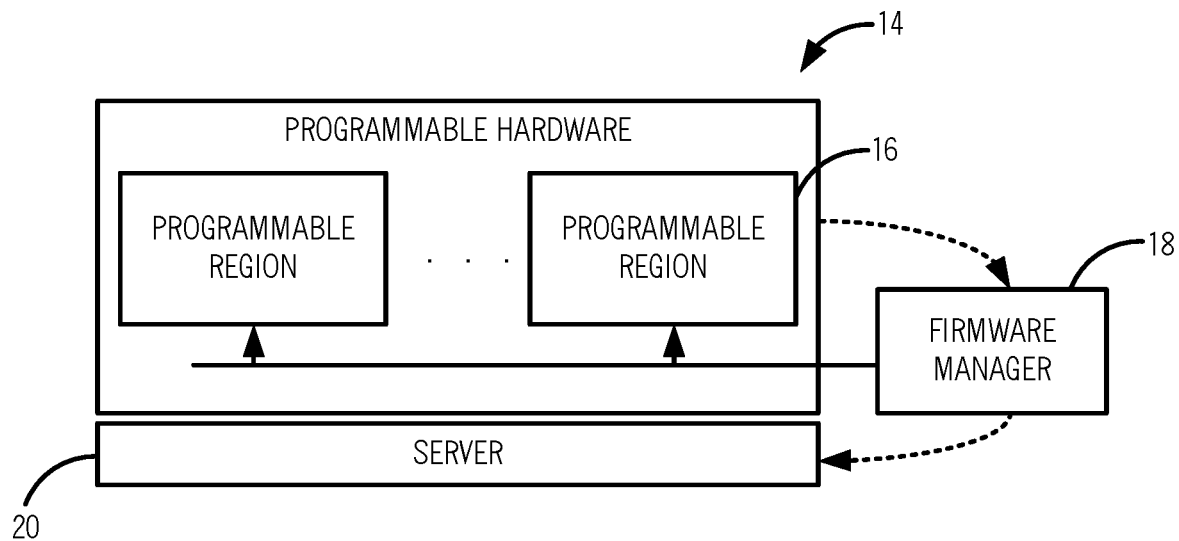
FIG. 3 is a block diagram of the programmable hardware of the programmable compute device of FIG. 2.

Referring to FIGS. 2 and 3, in an exemplary embodiment, block diagrams illustrate a programmable compute device 10 with programmable hardware 14 for executing VNFs. In FIG. 2, the programmable compute device 10 includes a common region 12 and one or more programmable hardware 14A, 14B, 14C regions communicatively coupled to the common region 12. The programmable compute device 10 supports hardware acceleration to perform some functions faster than is possible in software running on the GPPs. Normally, processors are sequential, and instructions are executed one by one. Various techniques are used to improve performance; hardware acceleration is one of them. The main difference between hardware and software is concurrency, allowing hardware to be much faster than software. Hardware accelerators are designed for computationally intensive software code. In FIG. 3, the programmable hardware 14 is shown with one or more programmable regions 16 therein which are communicatively coupled to a firmware manager 18 and a server 20 for programming thereof.

VNF Placement and Service Chaining

Figure 4:
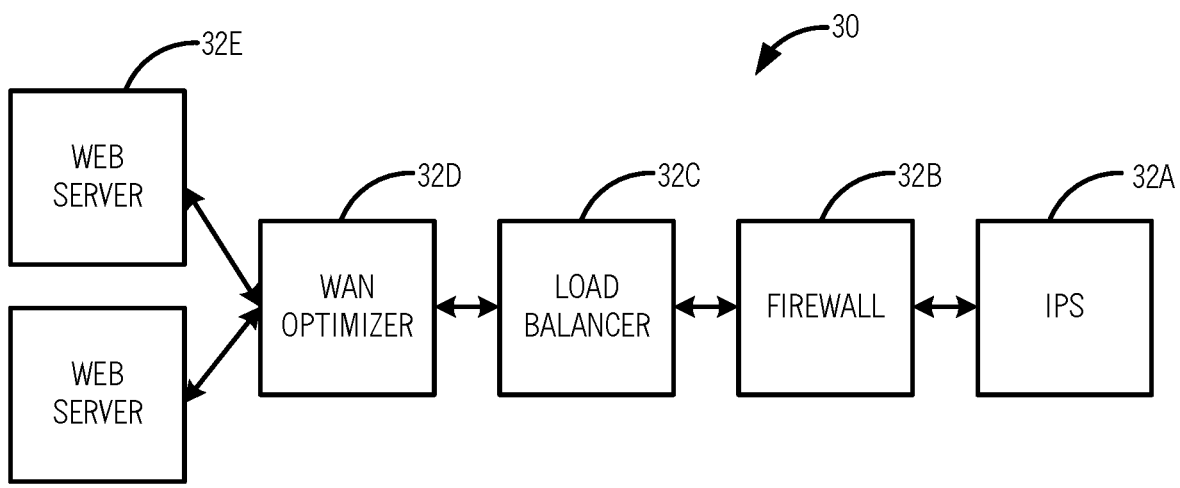
FIG. 4 is a logical diagram of a service chain with a plurality of VNFs.

Referring to FIG. 4, in an exemplary embodiment, a logical diagram illustrates a service chain 30 with a plurality of VNFs 32. VNF placement and the concept of service chaining is part of orchestration in SDN. Service chaining is the chaining of multiple VNFs to provide an overall product solution. For example, the service chain 30 includes an Intrusion Prevention System (IPS) 32A VNF, a firewall 32B VNF, a load balancer 32C VNF, a Wide Area Network (WAN) optimizer 32D VNF, and web servers 32E. Collectively, the service chain 30 provides a network service through the various VNFs 32.

A problem that comes with service chaining is VNF placement relative to the physical compute, network, and storage resources. Physical resources in a network are often geographically diverse with limited link layer resources, so a poorly executed service chain can suffer from low throughput and latency. The European Telecommunications Standards Institute (ETSI) has modeled a VNF Graph to orchestrate the service chain. The VNF graph models an end-to-end network service as a forwarding graph of network functions and end points/terminals. Specifics of the VNF graphs are described in M. Ersue, "ETSI NFV Management and Orchestration—An Overview," IETF #88, Vancouver, Canada, the contents of which are incorporated by reference. While the VNF graphs models VNF placement and service chaining, there is no specification for optimization thereof. Conventional least cost algorithms have been applied to service chaining for VNFs. But these approaches focus on VMs and have not been applied to VNFs with programmable Hardware Acceleration (HA), and more specifically hybrid (HA+VM) VNFs with the partial reconfiguration of the HA elements, through the programmable compute device 10.

Optimization of Service Chains

The systems and methods optimize hybrid HA+VM VNF service chains with the dynamic placement of HA elements, and orchestration of HA elements in an SDN network, leveraging hybrid service chains, and partial reconfiguration of FPGAs. As described herein, a hybrid service chain includes different hardware embodiments for implementing different VNFs, e.g., VM hosts and HA hosts. Another aspect of the systems and methods is the use of a control plane to assist in migration to/from HA/VM elements. The systems and methods include an orchestrator resource model for programmable HA resources with the programmable regions 16, the firmware manager 18 hosted by the server 20 capable of installing images into the programmable regions 16 through SDN orchestrator, a Service Chain Optimizer (e.g., a Path Computation Engine (PCE) and Policy Engine), and a control plane to set up and alter connections from the VNF Graph.

Hybrid Service Chain Use Case Examples

Figure 5A:
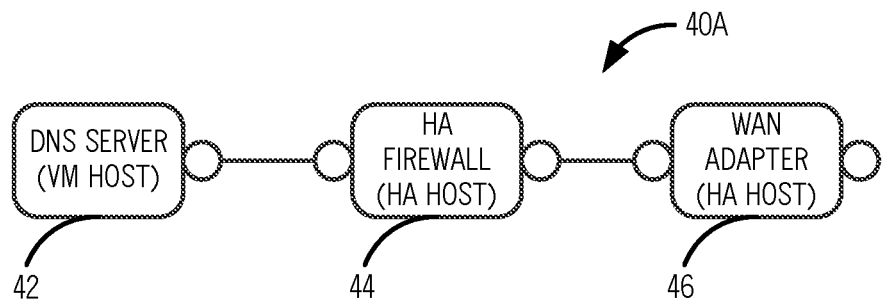
FIGS. 5A-5D are block diagrams of exemplary hybrid service chains.
Figure 5B:
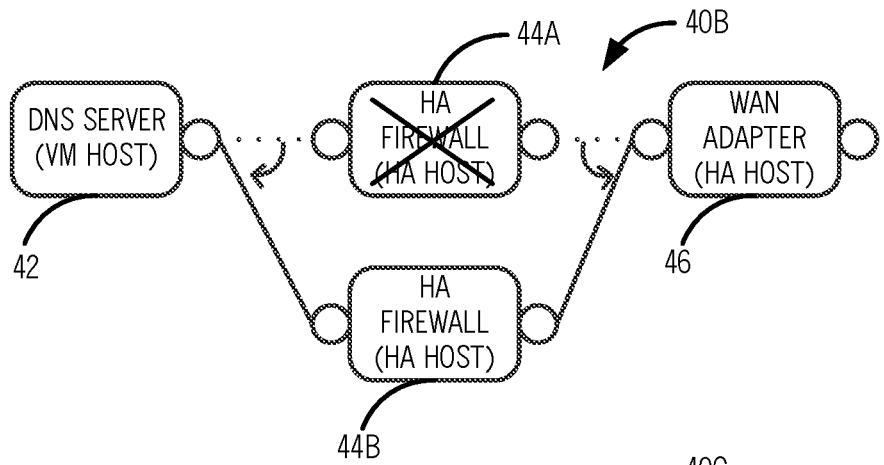

Referring to FIGS. 5A-5D, in an exemplary embodiment, block diagrams illustrate exemplary hybrid service chains 40. FIG. 5A illustrates a simple hybrid service chain 40A with a Domain Name System (DNS) server 42 on a VM host, an HA firewall 44 on an HA host, and a WAN adapter 46 on an HA host. For the simple hybrid service chain 40A, the systems and methods are configured to create this service chain with the least cost path, for example. FIG. 5B illustrates a dynamic case for a hybrid service chain 40B which is similar to the hybrid service chain 40A but shown with a failure in an HA firewall 44A on the HA host. The systems and methods are configured to create a backup HA VNF element for an HA firewall 44B on an HA host with the least cost path to reconnect the service chain to restore service.

Figure 5C:
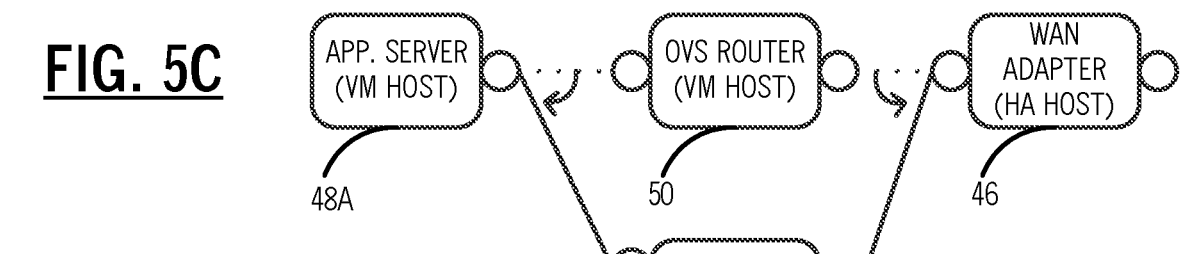

FIG. 5C illustrates a hybrid service chain 40C for a dynamic case of migration to HA. First, the hybrid service chain 40C has an application server 48A on a VM host connected to an Open vSwitch (OVS) router 50 on a VM host and a WAN adapter 46 on an HA host. Second, the systems and methods are configured to support additional capacity, e.g., via another application server 48B, by creating a new HA VNF router 52 with the least cost path and to reconnect the service chain to support new services with minimal service interruption using a Make-Before-Break (MBB) function, for example.

Figure 5D:
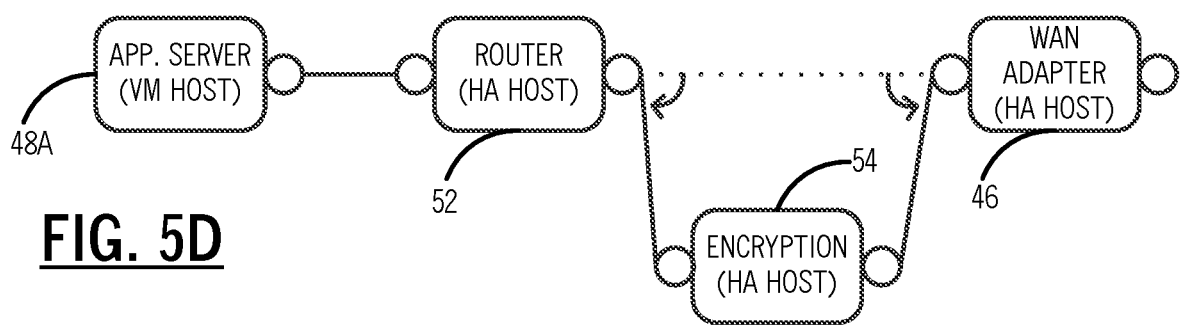

FIG. 5D illustrates a hybrid service chain 40D for a dynamic case of addition. First, the hybrid service chain 40D includes the application server 48A connected to the HA VNF router 52 and the WAN adapter 46. Next, there is an increased security requirement, and the systems and methods create a new HA VNF encryption 54 element with the least cost path. The elements are connected in the service chain 40D to provide HW encryption with minimal service interruption using an MBB function, for example. Also, the addition of the encryption 54 element can be orchestrated at both ends of the network.

Of course, other use cases are also contemplated with FIGS. 5A-5D presented for illustration. Other use cases could include, for example, deleting services, upgrading services, load balancing services, etc. Another approach could also include defragmentation of resources.

VNF Service Chain Optimization System

Figure 6:
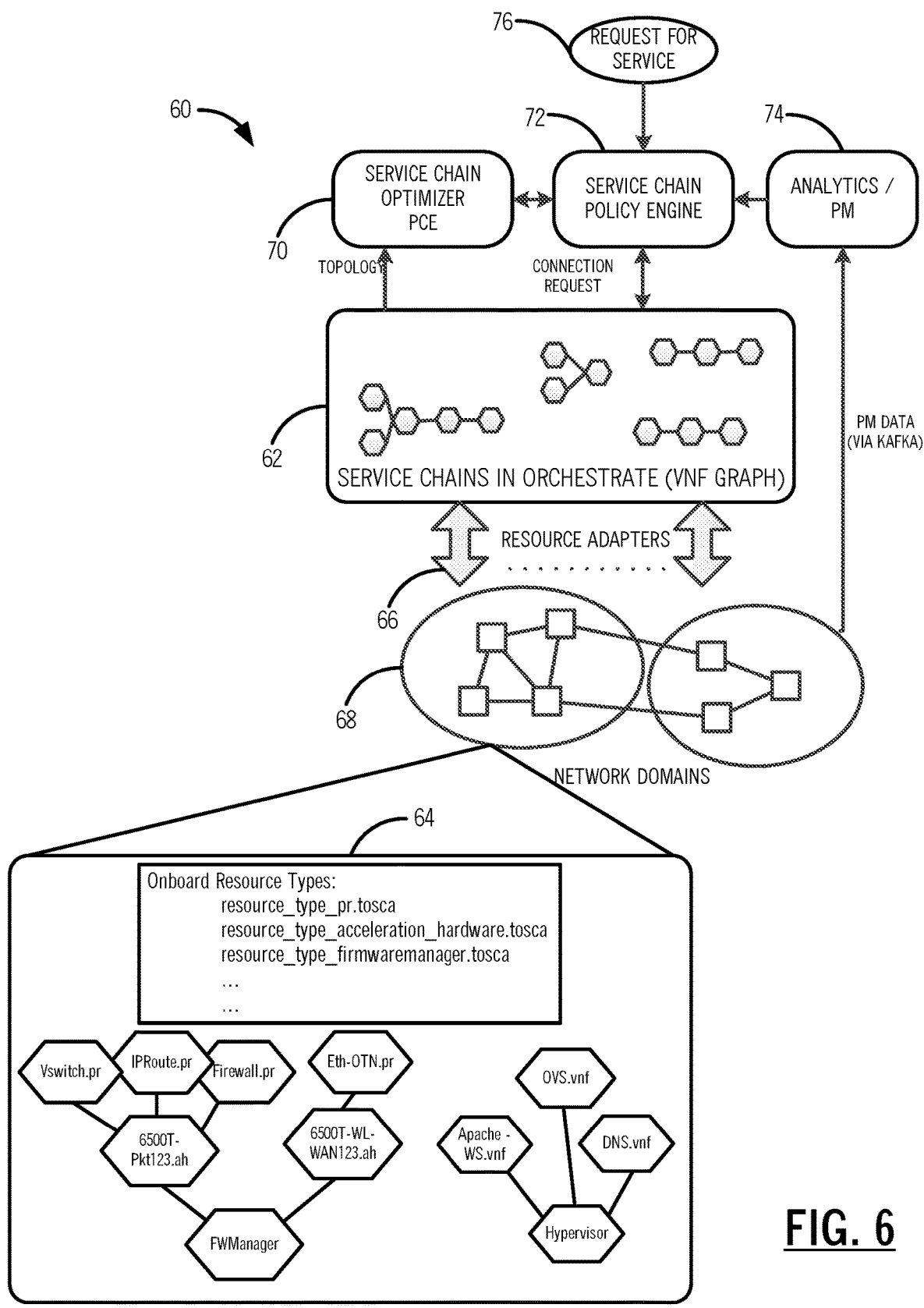
FIG. 6 is a block diagram of a VNF service chain optimization system.

Referring to FIG. 6, in an exemplary embodiment, a block diagram illustrates a VNF service chain optimization system 60. The VNF service chain optimization system 60 includes an SDN orchestrator 62, VNF resources 64 including hardware acceleration, resource adapters 66 to perform orchestration with different elements in a network 68, a Service Chain Optimizer PCE 70, a Policy Engine 72, and a database 74 for analytics and performance monitoring data. In order to orchestrate the HA VNFs, the service chain optimization system 60 supports the partial reconfiguration capability of FPGAs, as these will be one of the dominant HA resources in the network. Partial reconfiguration allows multiple HA VNFs within a single physical component. As illustrated in FIGS. 2 and 3, FPGAs can be sub-divided into multiple programmable regions 16 which are Partial Reconfiguration Regions (PRs), a.k.a. Virtualized FPGA Resources (VFRs). Individual programmable regions 16 can be loaded with a firmware image to perform a specific network function. Devices also include the common region 12 for interconnect, shared resources, soft or hard processor cores, etc.

The programmable region 16 is the actual programmable region that will host the HA VNF and is contained in Acceleration HW. It has properties of a PR Firmware Image, and State (loaded, unloaded, etc.). An exemplary list of hardware accelerated network functions that can be programmed into the programmable region 16 includes, without limitation, Packet processor, Hardware encryption, Layer 1 framer/mux, Layer 2 switch, Layer 3 router, Layer 1 to Layer 2 adapter, Hardware Firewall, Load Balancer, Layer 1 Forward Error Correction (FEC), and the like. Acceleration HW includes the device (FPGA) hosting the programmable region 16. It has the Base Load to support the host programmable regions 16. It has an array type attribute to manage the programmable regions 16, and it may also have an embedded processor and server properties. The firmware manager 18 hosts acceleration HW, and is capable of configuration and Universal Asynchronous Receiver/Transmitter (UART) for programmable device programmable regions 16 and is hosted by the server 20.

Figure 7:
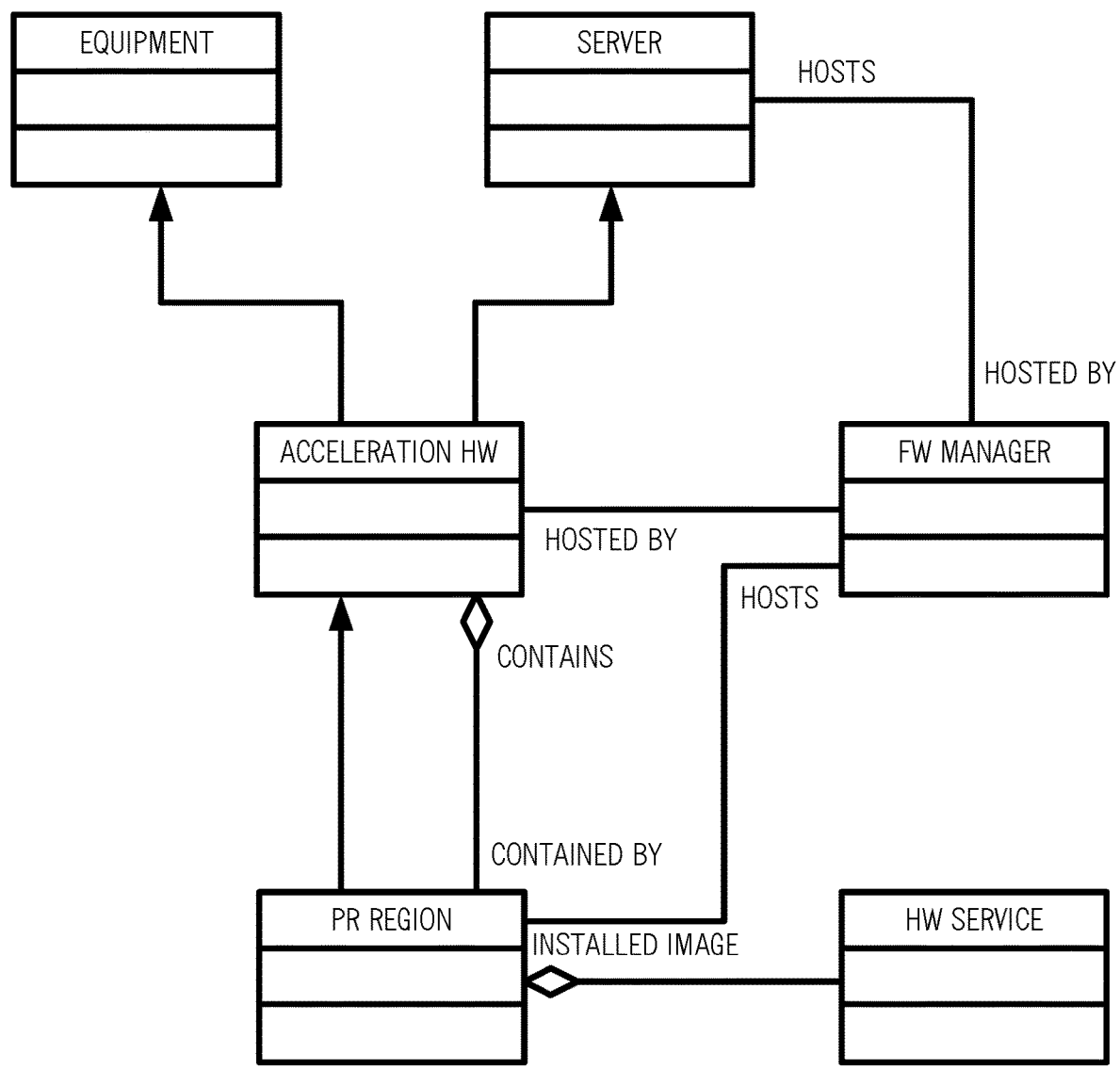
FIG. 7 is a logical diagram of an object model illustrating the object relationships between the programmable regions, the firmware manager, the server, and the acceleration hardware.

Note that in the context of SDN, the relationship between the firmware manager 18 and the Acceleration HW is analogous to the relationship between a Hypervisor and VMs. Referring to FIG. 7, in an exemplary embodiment, a logical diagram illustrates an object model illustrating the object relationships between the programmable regions 16, the firmware manager 18, the server 20, and the acceleration hardware. As with other resources in the Orchestrator 62, these resource types are on-boarded by the resource adapters 66. The resource adapters 66 can interface directly with the firmware manager 18 host, or through an intermediate controller like OpenStack. Service chains are constructed through the Orchestrator 62 based on a request for service 76, or automatically through the Service Chain Optimizer PCE 70 and/or the Policy Engine 72.

Exemplary Implementation of Service Chain Optimization

Figure 8:
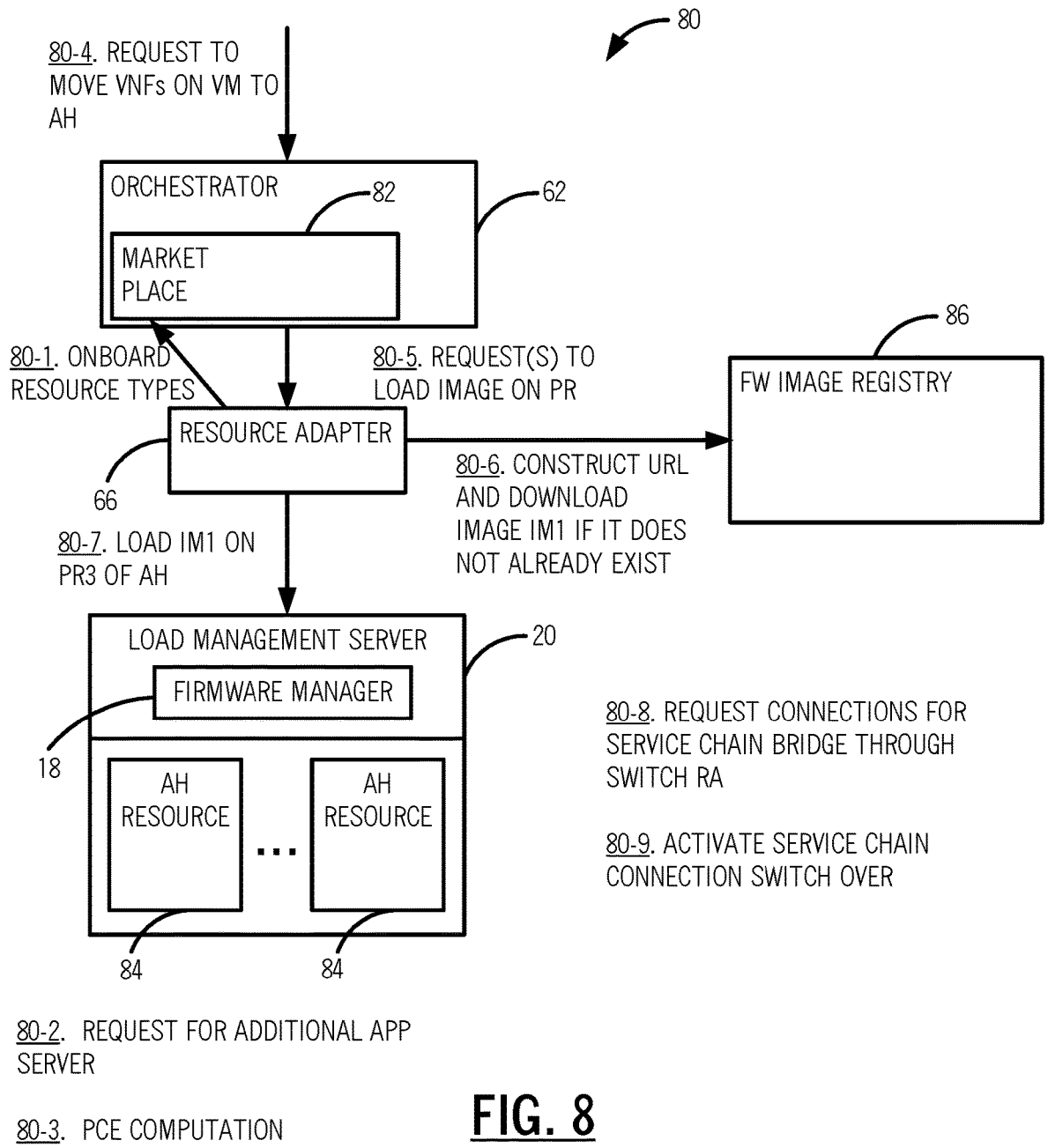
FIG. 8 is a flow diagram of an exemplary implementation of the hybrid service chain in FIG. 5C.

Referring to FIG. 8, in an exemplary embodiment, a flow diagram illustrates an exemplary implementation 80 of the hybrid service chain 40C in FIG. 5C. The implementation 80 includes resources on-boarded, from the resource adapter 56, into the orchestrator 52, such as through a marketplace 82 in the orchestrator 62 (step 80-1). A request 76 for the additional application server 48B is received for the hybrid service chain 40C (step 80-2). For example, the request 76 can be based on the additional application server 48B causing the service in the hybrid service chain 40C to cross a maximum bandwidth threshold. The request 76 is sent to the service chain optimizer PCE 70 for migration into the HA router 52. The PCE 70 computes least cost path to the HA Router 52 using the least cost algorithm. Next, a request is sent, from the PCE 70 to the orchestrator 62, to move the VNFs on a VM to acceleration hardware (AH) resources 84 (step 80-4). The orchestrator 62 requests the resource adapter 66 to load an image on the programmable regions 16 (step 80-5).

The resource adapter 66 constructs a Uniform Resource Locator (URL) and downloads an image to an image registry 86 if it does not exist already (step 80-6). The resource adapter 66 loads the image onto the programmable region 16 of the AH resources 84 (step 80-7). Next, the resource adapter 66 requests the connections switch in the service chain bridge (step 80-8). Finally, the service chain 40C is activated after the switch over (step 80-9). The service chain bridge and switchover (steps 80-8, 80-9) can make use of a signaled Make Before Break (MBB) operation. The MBB operation can be through existing closed control plane (e.g., Optical Signal and Routing Protocol (OSRP)) within a domain or an open standard (e.g. Generalized Multiprotocol Label Switching (GMPLS)) across domains. Note that the migration use case is not limited to MBB. Alternatively, MPLS fast re-route or other switching methods can also be used.

Referring to FIGS. 9A, 9B, and 9C, in an exemplary embodiment, network diagrams illustrate a network 90 for implementing the hybrid service chain 40C and the implementation 80. In FIG. 9A, the hybrid service chain 40C is between the application server 48A, the OVS router 50, and the WAN adapter 46, on a path 92. As described in the implementation 80, there is a need for new applications, e.g., via the application server 48B, and the PCE 70 determines placement for the new apps and AH router 52, the instantiation via the orchestrator 62 and the resource adapter 66. In FIG. 9B, a network MBB connection is made between the application server 48A and the AH router 52 and between the application server 48B and the AH router 52, and the WAN adapter 46 is still selecting from the OVS router 50. In FIG. 9C, an MBB signal selector at the WAN adapter 46 is triggers, and the VM resources are free (associated with the OVS router 50).

Path Computation Costs

Figure 10:
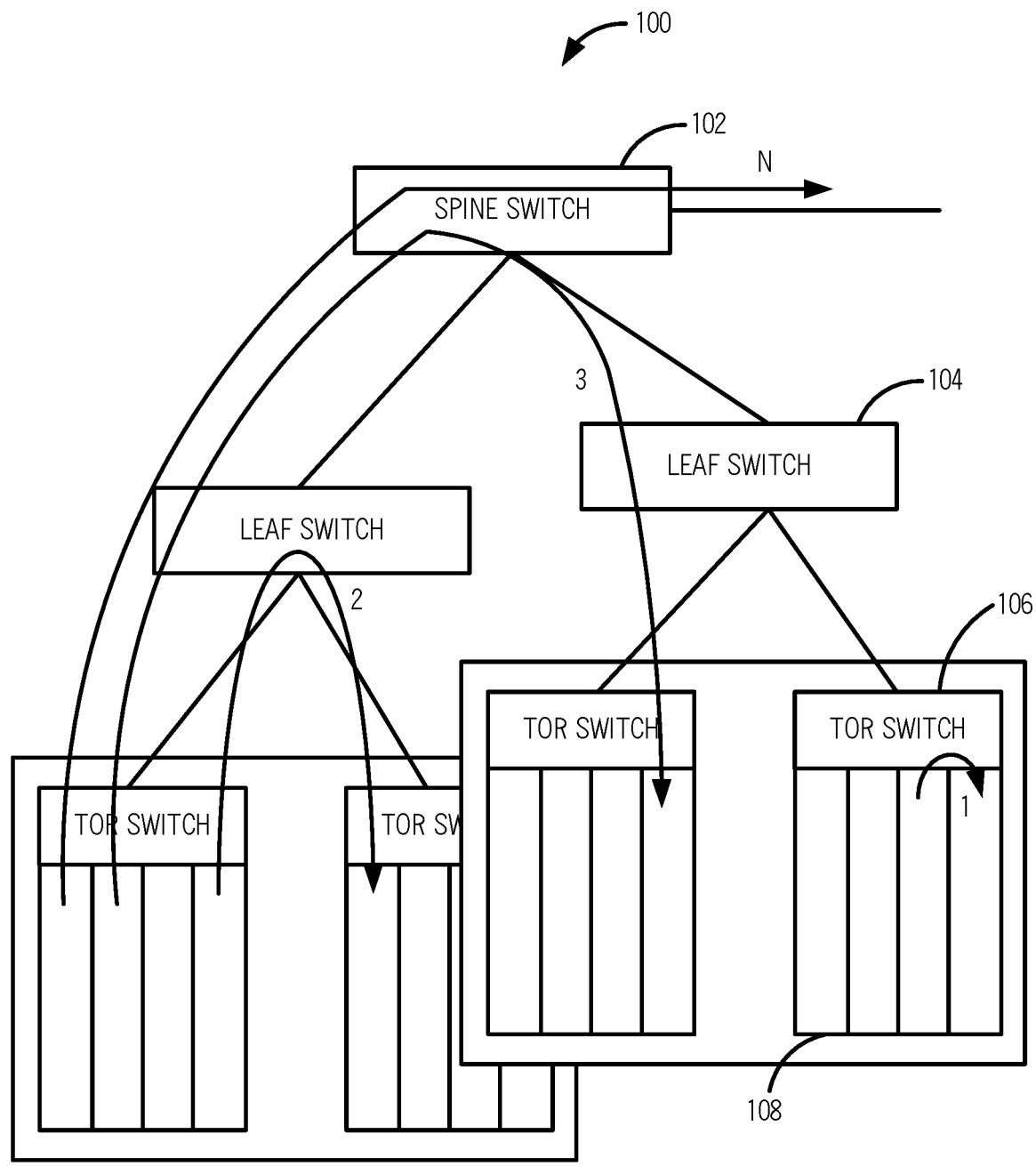
FIG. 10 is a network diagram of a data center configuration for describing path computation costs.

Referring to FIG. 10, in an exemplary embodiment, a network diagram illustrates a data center configuration 100 for describing path computation costs. Path computation connection cost is the lowest for connections within a host HA or GPP element. Clustering elements within an FPGA across PR regions would give the lowest latency. But chain distribution can be across equipment, switching elements, or data centers. The data center configuration 100 generally includes a hierarchy with a spine switch 102, leaf switches 104, Top-of-Rack (TOR) switches 106, and modules 108 in a rack. Using this hierarchy, the following costs can be assigned to connectivity in a service chain cost model in a typical data center switch:

| Element | Cost |
| --- | --- |
| Module | 0 |
| Top/Middle of Rack (fabric) | 1 |
| Leaf (rack-to-rack) | 2 |
| Spine (pool-to-pool) | 3 |
| Site-to-Site | N × hops |

Of course, other configurations of the service chain cost model are also contemplated based on actual network connectivity, with different cost assignments. The service chain cost model can be used to assign a cost to each connection in the hybrid service chain 40, with an objective to assign a specific network service based on lowest cost.

Exemplary Switching Element

Figure 11:
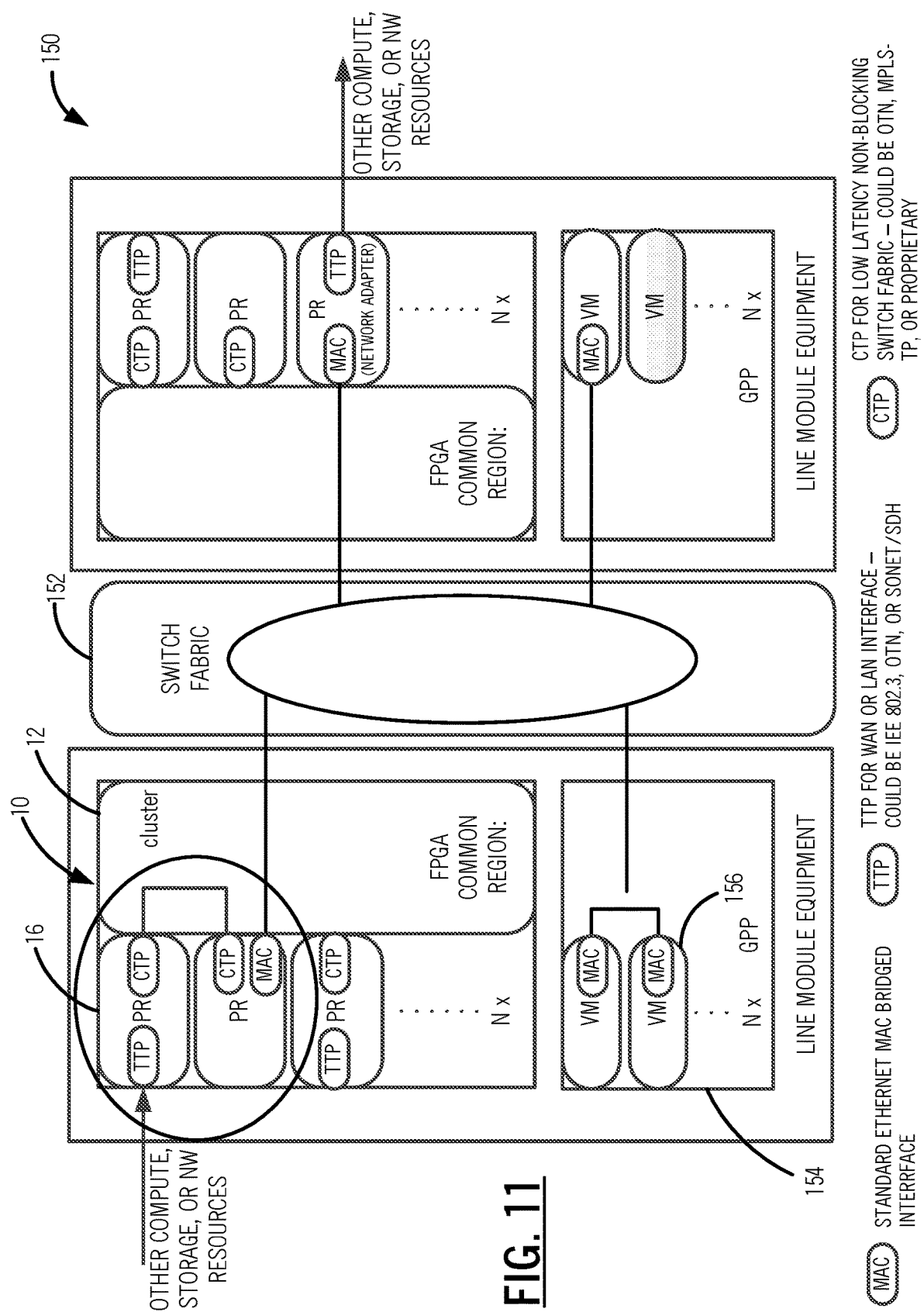
FIG. 11 is a block diagram of an exemplary switching element illustrating the programmable compute device with the systems and methods.

Referring to FIG. 11, in an exemplary embodiment, a block diagram illustrates an exemplary switching element 150 illustrating the programmable compute device 10 with the systems and methods. The switching element 150 includes one or more of the programmable compute devices 10, a switch fabric 152, and optionally one or more GPPs 154. The programmable compute devices 10, and the GPPs 154 communicate to one another via the switch fabric 152. The GPPs 154 can include VMs 156 with standard Ethernet Media Access Control (MAC) bridged interfaces. The programmable compute devices 10 include the common region 12, such as for interfacing the switch fabric 152, and the programmable regions 16. The programmable regions 16 can include MAC bridged interfaces, Connection Termination Points (CTPs), and Trail Termination Points (TTP). The TTP can be for a WAN or Local Area Network (LAN) interface, such as IEEE 802.3, Optical Transport Network (OTN), Synchronous Optical Network (SONET), or Synchronous Digital Hierarchy (SDH). The CTP can be for low latency, non-blocking interface to the switch fabric 152, such as OTN, MPLS-Transport Profile (MPLS-TP), or the like.

Process for Virtual Network Function (VNF) Service Chain Optimization

Figure 12:
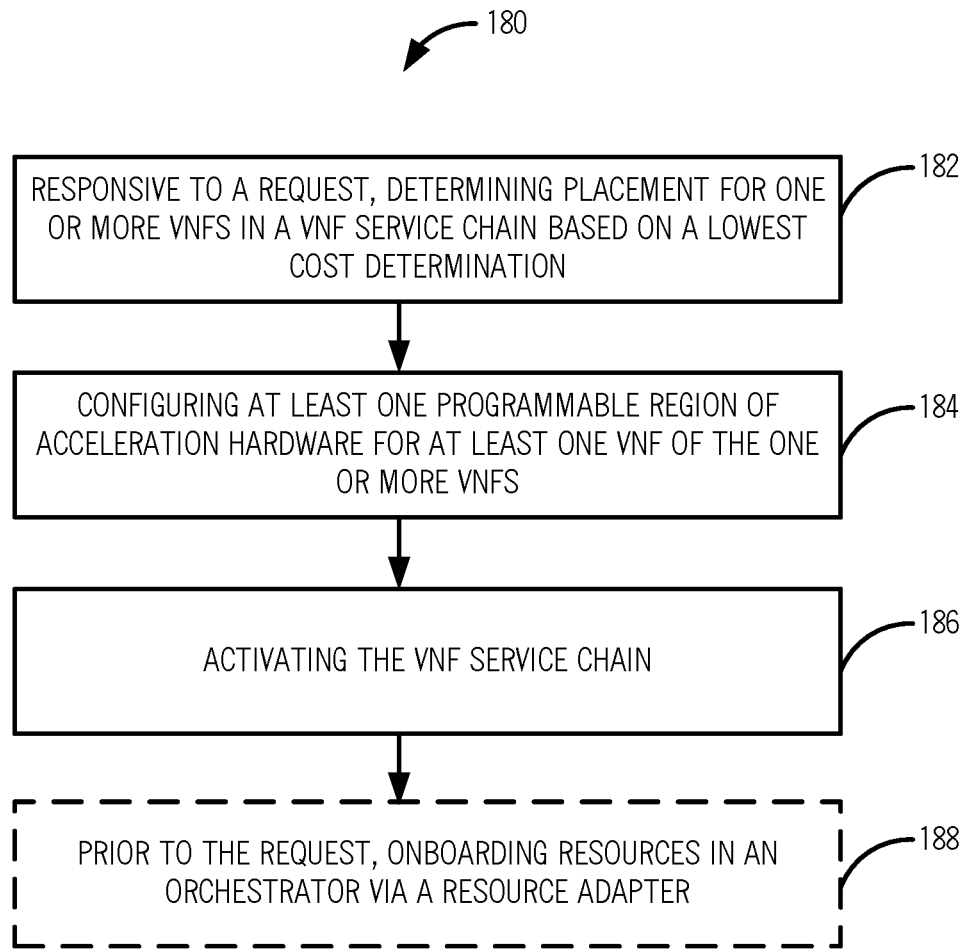
FIG. 12 is a flowchart of a process for Virtual Network Function (VNF) service chain optimization.

Referring to FIG. 12, in an exemplary embodiment, a flowchart illustrates a process 180 for Virtual Network Function (VNF) service chain optimization. The process 180 includes, responsive to a request, determining placement for one or more VNFs in a VNF service chain based on a lowest cost determination (step 182); configuring at least one programmable region of acceleration hardware for at least one VNF of the one or more VNFs (step 184); and activating the VNF service chain (step 186). The process 180 can also include, prior to the request, onboarding resources in an orchestrator via a resource adapter (step 188). The lowest cost determination can be based on a service chain cost model that assigns costs based on connectivity between switching elements and between hops between sites. The activating can include a Make-Before-Break (MBB) operation in a network to minimize service interruption of the VNF service chain. The request can be based on one of crossing a bandwidth threshold, a new service, a failure of a VNF in the VNF service chain, additional applications in the VNF service chain, and additional VNFs in the VNF service chain. The request can be based on monitoring analytics and performance monitoring where the VNF service chain exists to determine optimization is required. The request can be to move the at least one VNF from a Virtual Machine (VM) to the at least one programmable region of acceleration hardware. The configuring can include programming the at least one programmable region for any functionality including packet processing, hardware encryption, Layer 1 framing/muxing, Layer 2 switching, Layer 3 routing, Layer 1 to Layer 2 adaptation, hardware firewall, load balancing, and Layer 1 Forward Error Correction.

In another exemplary embodiment, an apparatus for Virtual Network Function (VNF) service chain optimization includes circuitry adapted to determine placement for one or more VNFs in a VNF service chain based on the lowest cost determination responsive to a request; circuitry adapted to configure at least one programmable region of acceleration hardware for at least one VNF of the one or more VNFs; and circuitry adapted to cause activation of the VNF service chain. In a further exemplary embodiment, a server adapted for Virtual Network Function (VNF) service chain optimization includes a network interface and a processor; and memory storing instructions that, when executed, cause the processor to, responsive to a request, determine placement for one or more VNFs in a VNF service chain based on a lowest cost determination, configure at least one programmable region of acceleration hardware for at least one VNF of the one or more VNFs, and activate the VNF service chain.

Dynamic NFV Management

Conventional NFV management presents users with all the NFV service, network service, and VNF resources that have been on-boarded. This does not take into account the current state of NFVI resources or dynamic pricing/utilization. That is, conventional NFV management is not aware of usage patterns, within data centers and across different data centers. Accordingly, the systems and methods can include an orchestration system to correlate across multiple NFV-MANO systems using the NS Catalog, VNF Catalog, NFV Instances, and NFVI resources, for orchestrated control of physical and virtual resources. The orchestration system can provide a service provider with the dynamic management and pricing as the actionable response to data analytics on the VNF data sources. The orchestration system allows an enterprise user to select the most suitable choice of VNFs and/or VNF Forwarding Graphs.

NFV-MANO Framework

Figure 13:
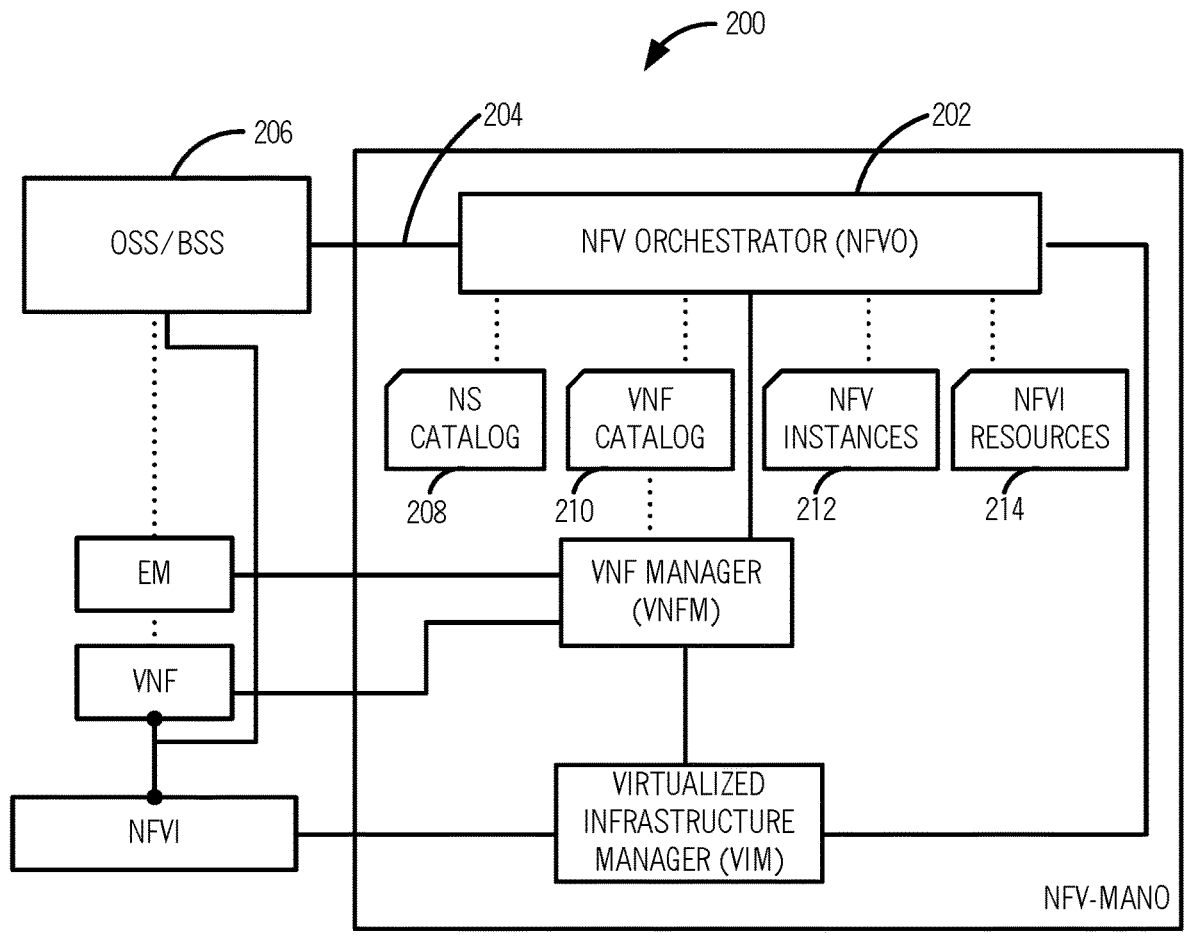
FIG. 13 is a block diagram of a Network Functions Virtualization Management and Orchestration Architectural framework (NFV-MANO) framework.

Referring to FIG. 13, in an exemplary embodiment, a block diagram illustrates an NFV-MANO framework 200. Dynamic NFV management aims at utilizing data from orchestration systems 202 for the dynamic management and pricing of VNF resources. That is, the dynamic management is implemented on top of orchestration suites. The dynamic management can be realized in an application that uses the orchestration suites as data sources to perform dynamic management of NFVs. For example, the application can "tap" into a connection 204 between the orchestration systems 202 and an Operations Support System (OSS)/Business Support System (BSS) 206. The connection 204 uses an OS-MA-NFVO protocol. Specifically, the NFV-MANO framework 200 is specified in ETSI GS NFV-MAN 001 "Network Functions Virtualisation (NFV); Management and Orchestration," V1.1.1 (2014-12), the contents of which are incorporated by reference.

The dynamic management can be deployed as a stand-alone application in the NFV-MANO framework 200, an application in the OSS/BSS 206, an application in the orchestration systems 202, or the like. Conventional OSS/BSS 206 systems are not agile enough to react to the real-time aspect of dynamic product creation or pricing. Here, the service providers can create a set of "base" products a priori. The dynamic management will filter out the "base" products if there are no virtual resources to support them. In addition, since the dynamic management has the knowledge of both the virtual and hardware resources, it can either up-sell a product to utilize the "leftover" resources, or it can dynamically create a "new" product to utilize these "leftover" resources. Many operators are using VNFs to make their services and operations on networks more flexible and scalable. These operators plan to allow their customers to choose what particular VNFs (e.g., virtual firewall, virtual router, virtual load balancer, etc.) that are run for their enterprises.

In addition to the orchestration system 202 and the OSS/BSS 206, the NFV-MANO framework 200 includes an NS catalog 208, a VNF catalog 210, NFV instances 212, and NFVI resources 214. The NS catalog 208 contains the repository of all of the on-boarded Network Services. The VNF catalog 210 contains the repository of all of the VNF Packages. The NFV instances 212 contains all of the instantiated VNF and Network Service instances. The NFVI resources 214 contains information about available/reserved/allocated NFVI resources. This repository allows NFVI reserved/allocated resources to be tracked against the NS and VNF instances (e.g. number of Virtual Machines (VMs) used by a certain VNF instance).

Figure 14:
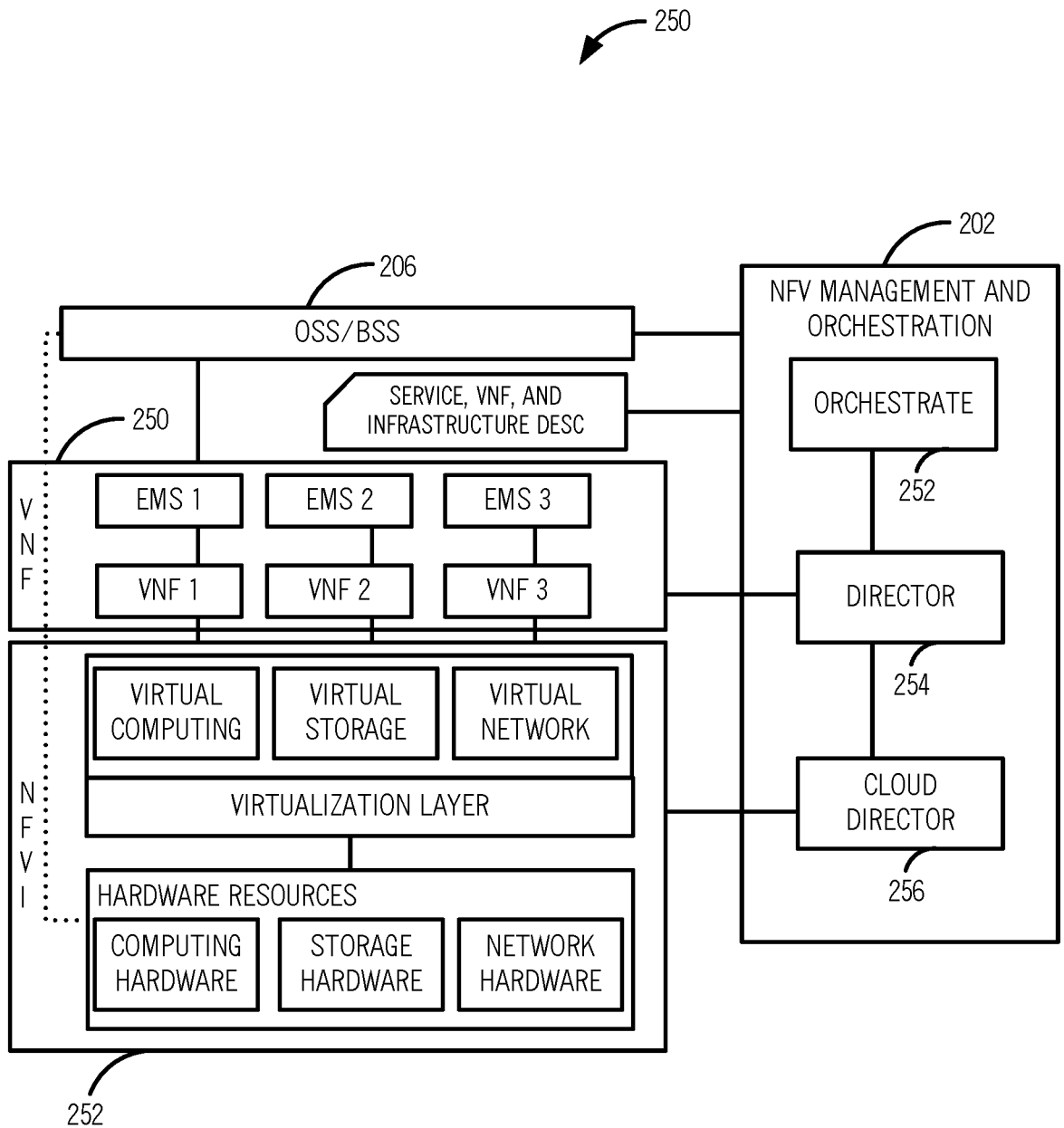
FIG. 14 is a block diagram of orchestration in an NFV architecture.

Referring to FIG. 14, in an exemplary embodiment, a block diagram illustrates orchestration 250 in an NFV architecture. The orchestration system 202 includes an orchestrate function 252, a director function 254, and a cloud director function 256. In this exemplary implementation, the orchestrate function 252 is acting the role of the NFV Orchestrator MANO. The cloud director function 256 is the Virtualized Infrastructure Manager (VIM). The director function 254 is the VNF Manger (VNFM).

The dynamic management is a big data analytic product that utilizes the information provided by one or more NFV-MANO systems. The dynamic management analyzes the information in the NFV instances and NFVI resources, to categorizes/prioritizes the consumed, reserved and available resources. For example, in FIG. 14, VNF1 is the most deployed VNF in a data center DC1. The service chain (VNF Forwarding Graph) VNF7→VNF22→VNF11 is the most commonly deployed in the service provider domain. Another example is the number of CPU cores, memory, storage and network interfaces available. This kind of information can be within one data center or across many data centers for the service provider.

When an enterprise user accesses a service provider web portal to select a VNF or service chain, the dynamic management utilizes the analyzed NFVI resources to filter out entries from the NS catalog 208 and the VNF catalog 210. Only entries from the NS catalog 208 and the VNF catalog 210 that can effectively utilize the available resources are presented to the enterprise user. For example, one VNF is supported for a specific VM provider. If the data center is serving the endpoint of the enterprise network service only has different VMs, the VNF entry will be filtered out.

The dynamic management employs a Template Engine and Policy Engine to dynamically generate VNF and Network Service "products" into the NS Catalog 208 and VNF Catalog 210. For example, an existing VNF in the VNF catalog 210 is rated as requiring 4 vCPU, 16 GB Memory, and 32 GB Storage to achieve 2 Gbps throughput. The Policy Engine constantly monitors the NFVI resources. Assume that there are only 2 vCPU, 8 GB Memory and 16 GB Storage left on a server in a rack. There is no existing VNF in the VNF catalog 210 that can utilize these resources on this server. The Policy Engine uses the Template Engine to "create" a new product that utilizes these resources with the rating of 800 Mbps throughput and inserts the "product" into the VNF catalog 210. This allows the service provider to fully utilize the available resources. Note that the dynamic generation of the product can be applied to the time duration of a customer interaction at a data center or equally applicable across data centers and future time periods. The service provider can utilize dynamic management invention to have auction-based spot pricing of VNF resources.

Dynamic NFV Management Application

Figure 15:
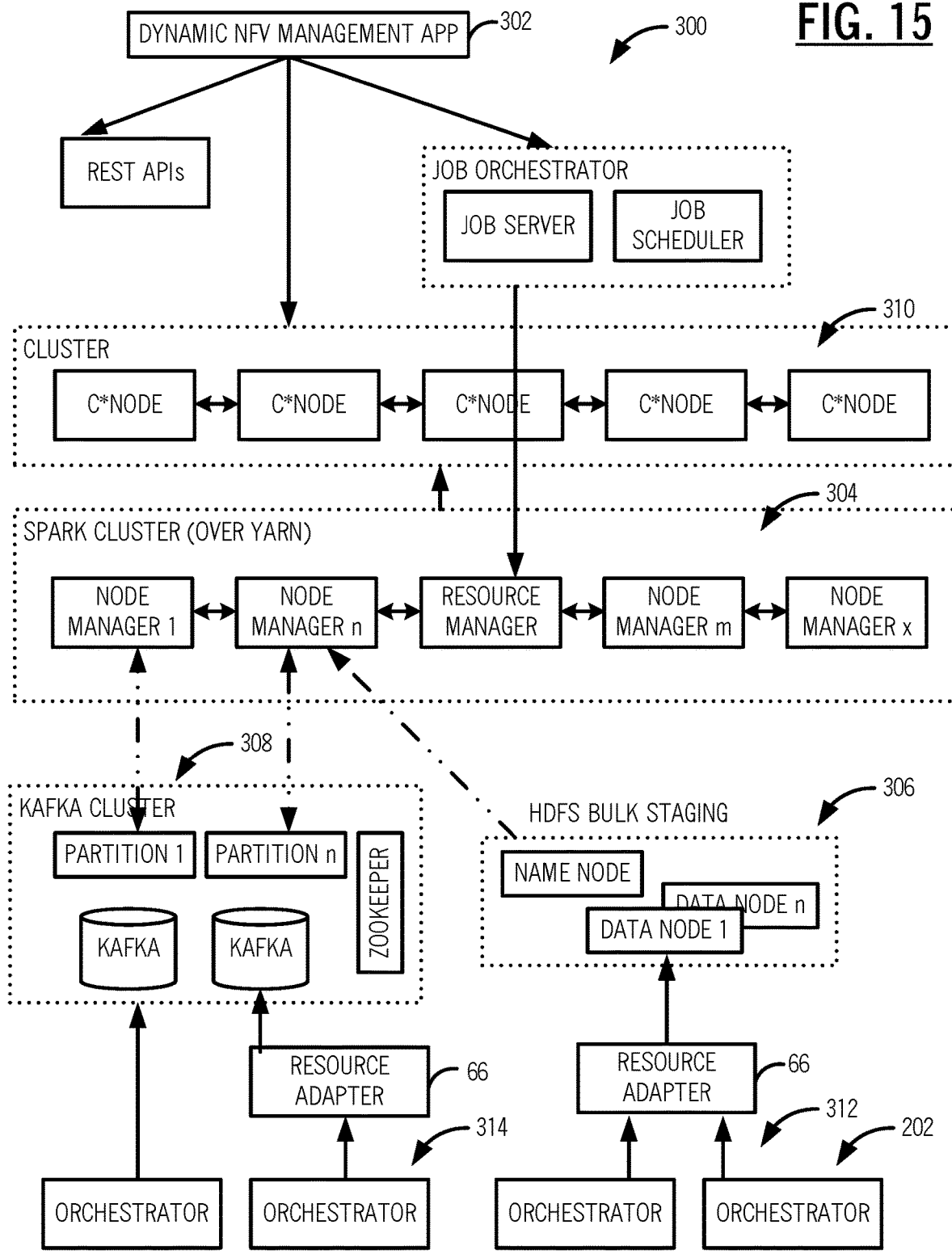
FIG. 15 is a block diagram of a big data analytic platform for implementing dynamic NFV management via a dynamic NFV management application.

Referring to FIG. 15, in an exemplary embodiment, a block diagram illustrates a big data analytic platform 300 for implementing dynamic NFV management via a dynamic NFV management application 302. The dynamic NFV management application 302 is an application running on top of a big data analytic platform. For an exemplary implementation, an Apache Spark platform 304 is described. Of course, the dynamic NFV management application 302 contemplates other platforms. Apache Spark is a fast and general engine for large-scale data processing. Spark powers a stack of libraries including Structured Query Language (SQL) and DataFrames, MLib for machine learning, GraphX and Spark Streaming. The dynamic management combines these libraries seamlessly in the dynamic NFV management application 302.

In an exemplary implementation, Spark is deployed on top of the Hadoop NextGen (YARN) 306. Bulk data is retrieved from the orchestration systems 202 and staged at an HDFS Bulk Staging area 306. The resource adapter 66 is used to retrieve data from the orchestration systems 202 via Representational State Transfer (REST) Application Programming Interfaces (APIs). REST APIs are also available from third-party orchestration systems. The resource adapter 66 is configured to normalize the different API schema into a common schema. Small and discreet events from the data sources are sent to Apache Kafka 308, a high through-put distributed messaging system. The orchestration systems 202 can already support sending messages to Kafka. For third party orchestration systems, another resource adapter 66 is used to normalize the message payload content and to send messages to Kafka.

The Spark Streaming processing jobs are submitted by the Dynamic NFV Management App (DNMA) 302. The Spark 304 Streaming cluster consumes and processes the both bulk data and small and discreet events. The result of the Spark processing is stored in a Cassandra cluster 310. Based on the result, the dynamic NFV management application 302 performs actions such as filtering out products from the catalogs of the orchestration systems 202, creating "new" products up-sell, and creating "new" products that monetize the "leftover" resources, etc.

As shown at point 312, the NS Catalog 208, the VNF Catalog 210, the NFV Instances 212, and the NFVI Resources 214 data are collected from the orchestrator systems 202, i.e., bulk data. For example, the resource adapter 66 invokes the REST APIs of the orchestrating systems 202. The content is processed and stored in the Cassandra data store. Small and discreet events can be obtained as well as shown at port 314.

Dynamic Pricing and Filtering

Figure 16:
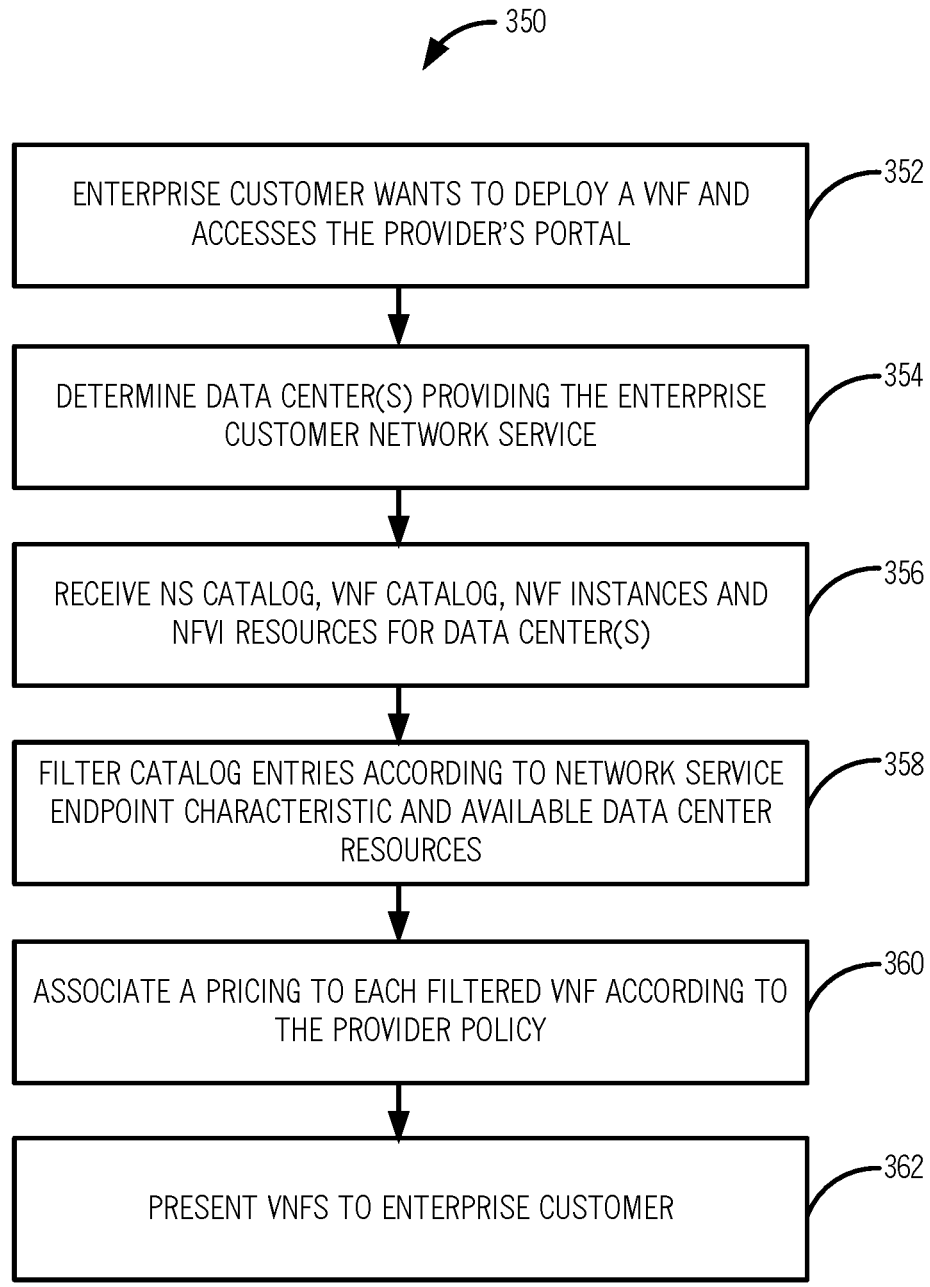
FIG. 16 is a flowchart of a dynamic pricing and filtering process, via the dynamic NFV management application.

Referring to FIG. 16, in an exemplary embodiment, a flowchart illustrates a dynamic pricing and filtering process 350, via the dynamic NFV management application 302. An enterprise user accesses a web portal of the service provider with the intent of deploying a VNF (e.g., a virtual firewall) (step 352). The dynamic NFV management application 302 identifies the one or more data centers nearest to the enterprise (step 354). The dynamic NFV management application 302 retrieves the data from the NS Catalog, VNF Catalog, and NFVI Resources data from the Cassandra cluster and correlates to the NFVI resources (step 356). The dynamic NFV management application 302 filters catalog entries according to network service endpoint characteristics and available data center resources (step 358). The dynamic NFV management application 302 utilizes the Policy Engine (with the service provider policies) to dynamically price the remaining VNFs according to provider policy (step 360), and presents the VNFs to the enterprise user (step 362).

Dynamic Product Generation

Figure 17:
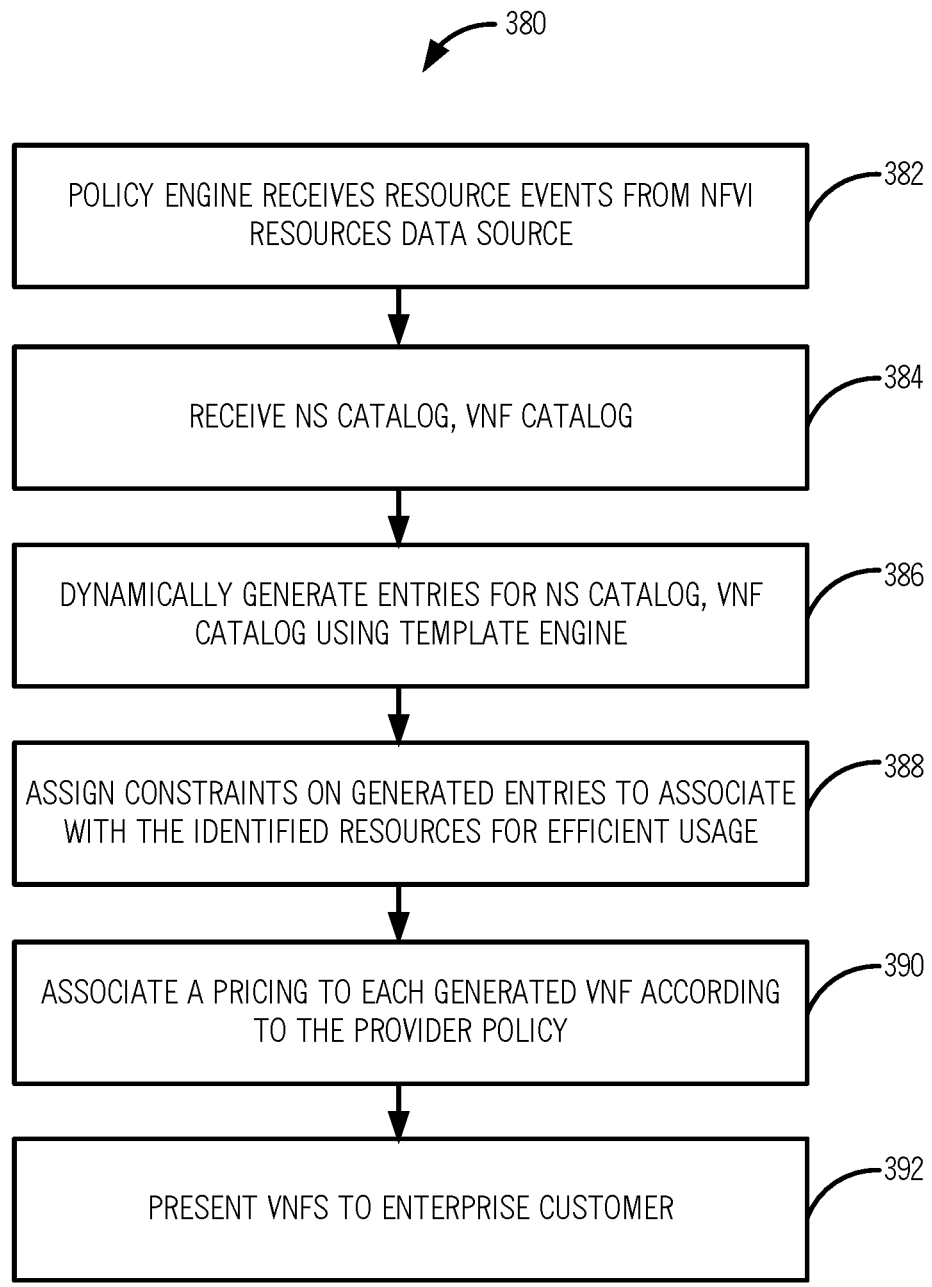
FIG. 17 is a flowchart of a dynamic product generation process.

Referring to FIG. 17, in an exemplary embodiment, a flowchart illustrates a dynamic product generation process 380. One or more NFV-MANO systems send events relating to the NFVI Resources changes to a high-throughput distributed messaging system (step 382). The dynamic NFV management application 302 Orchestrator Policy Engine receives these events (step 384). The dynamic NFV management application 302 Policy Engine correlates these events with data from the Virtualized Infrastructure Manager (VIM) to identify the physical resources managed by the VIM to dynamically generate entries for the NS catalog, VNG catalog using the Template Engine (step 386). The dynamic NFV management application 302 Policy Engine uses the Template Engine to dynamically generate a constrained version of existing VNF and NS Catalog entries (step 388).

For example, an existing VNF in the VNF Catalog is rated as requiring 4 vCPU, 16 GB Memory, and 32 GB Storage to achieve 2 Gbps throughput. The dynamic NFV management application 302 Policy Engine uses the Template Engine to "create" a new product that utilizes remaining resources with the rating of 800 Mbps throughput and inserts the "product" into the catalog. This allows the service provider to fully utilize all the available resources. The service provider can also utilize the dynamic NFV management application 302 Policy Engine to associate an auction-based "spot" price for this 800 Mbps throughput VNF to monetize the otherwise unused resources (step 390). The VNFs is presented to the enterprise customer (step 392).

The dynamic NFV management application 302 can utilize MLib from Spark to decide on the creation of products. For example, VNF1 is the most deployed VNF in the Data Center DC1. If there are "leftover" resources available in DC1, the dynamic NFV management application 302 will create a new VNF1 product to utilize these resources. The service chain VNF7→VNF22→VNF11 is the most deployed in the service provider domain. This is derived from MLib correlation algorithm. The varieties of possibilities are narrowed down using these MLib algorithms.

Exemplary Server

Figure 18:
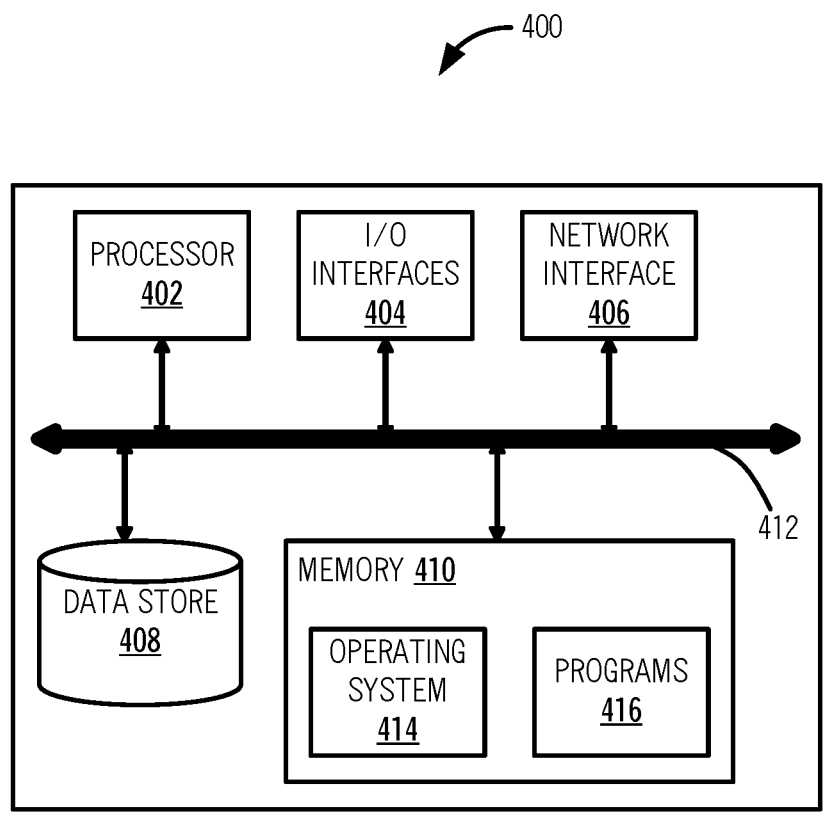
FIG. 18 is a block diagram of an exemplary implementation of a server.

Referring to FIG. 18, in an exemplary embodiment, a block diagram illustrates an exemplary implementation of a server 400. The server 400 can be a digital processing device that, in terms of hardware architecture and functionality, generally includes a processor 402, input/output (I/O) interfaces 404, a network interface 406, a data store 408, and memory 410. It should be appreciated by those of ordinary skill in the art that FIG. 18 depicts the server 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 can include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the server 400, a semiconductor-based microprocessor (in the form of a microchip or chip set), or generally any device for executing software instructions. When the server 400 is in operation, the processor 402 is configured to execute software stored within the memory 410, to communicate data to and from the memory 410, and to generally control operations of the server 400 pursuant to the software instructions. The I/O interfaces 404 can be used to receive user input from and/or for providing system output to one or more devices or components. The network interface 406 can be used to enable the server 400 to communicate on a network.

The data store 408 can be used to store data. The data store 408 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 can incorporate electronic, magnetic, optical, and/or other types of storage media. The memory 410 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 410 can incorporate electronic, magnetic, optical, and/or other types of storage media. Note that the memory 410 can have a distributed architecture, where various components are situated remotely from one another, but can be accessed by the processor 402. The software in memory 410 can include one or more software programs, each of which includes an ordered listing of executable instructions for implementing logical functions. The software in the memory 410 includes a suitable operating system (O/S) 414 and one or more programs 416. The operating system 414 essentially controls the execution of other computer programs, such as the one or more programs 416, and provides scheduling, input-output control, file and data management, memory management, and communication control and related services. The one or more programs 416 may be configured to implement the various processes, algorithms, methods, techniques, etc. described herein.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for Virtual Network Function (VNF) service chain optimization, the method comprising:
providing a first VNF service chain having a plurality of VNFs, the first VNF service chain configured as a hybrid service chain including one or more Hardware Acceleration (HA) elements and one or more Virtual Machine (VM) elements, the first VNF service chain further including an application server hosted on one of the one or more VM elements, wherein the one or more HA elements are configured to perform functions faster than the one or more VM elements operating on general purpose processors,
responsive to a request for VNF service chain optimization in the first VNF service chain and responsive to a request for an additional application server in the first VNF service chain, determining placement for one or more of the plurality of VNFs within the first VNF service chain based on a lowest cost determination, wherein the placement includes locating at least one VNF in the one or more HA elements, and wherein the at least one VNF in the one or more HA elements is configured to perform one or more functions of operating at a line rate, performing routing, and performing switching;
responsive to determining placement for the one or more VNFs, configuring a programmable region of the one or more HA elements for the at least one VNF, wherein the one or more HA elements include i) a plurality of programmable regions each being a partial reconfiguration region configured to support a VNF and ii) a common region connected to the plurality of programmable regions to support interconnect and shared resources for the plurality of programmable regions; and
activating a new VNF service chain, wherein the activating includes a Make-Before-Break (MBB) operation in a network which creates the new VNF service chain based on the VNF service chain optimization and switches the first VNF service chain to the new VNF service chain after the new VNF service chain is established to minimize service interruption over the VNF service chains.

2. The method of claim 1, wherein the lowest cost determination is based on a service chain cost model that assigns costs based on connectivity between switching elements and based on a number of hops.

3. The method of claim 1, further comprising:
prior to the request for VNF service chain optimization, onboarding resources in an orchestrator via a resource adapter, wherein the resources include a firmware load, the acceleration hardware, and the programmable region.

4. The method of claim 1, wherein the request for VNF service chain optimization is based on one of crossing a bandwidth threshold, a new service, a failure of a VNF in the first VNF service chain, additional application in the first VNF service chain, and additional VNF in the first VNF service chain.

5. The method of claim 1, wherein the request for VNF service chain optimization is based on monitoring analytics and performance monitoring where the first VNF service chain exists to determine optimization.

6. The method of claim 1, wherein the request for VNF service chain optimization is to move the at least one VNF from one of the one or more VM elements to the programmable region of one of the one or more HA elements.

7. The method of claim 1, wherein the configuring comprises programming the programmable region for any functionality comprising packet processing, hardware encryption, Layer 1 framing/muxing, Layer 2 switching, Layer 3 routing, Layer 1 to Layer 2 adaptation, hardware firewall, load balancing, and Layer 1 Forward Error Correction.

8. An apparatus for Virtual Network Function (VNF) service chain optimization, the apparatus comprising:
a first VNF service chain having a plurality of VNFs, the first VNF service chain configured as a hybrid service chain including one or more Hardware Acceleration (HA) elements and one or more Virtual Machine (VM) elements, the first VNF service chain further including an application server hosted on one of the one or more VM elements, wherein the one or more HA elements are configured to perform functions faster than the one or more VM elements operating on general purpose processors;
circuitry responsive to a request for VNF service chain optimization in the first VNF service chain and responsive to a request for an additional application server in the first VNF service chain, the circuitry adapted to determine placement for one or more of the plurality of VNFs within the first VNF service chain based on a lowest cost determination responsive to a request for the VNF service chain optimization, wherein the placement includes locating at least one VNF in the one or more HA elements, and wherein the at least one VNF in the one or more HA elements is configured to perform one or more functions of operating at a line rate, performing routing, and performing switching;
circuitry adapted to configure a programmable region of the one or more HA elements for the at least one VNF responsive to the determination of the placement for the one or more VNFs, wherein the one or more HA elements include i) a plurality of programmable regions each being a partial reconfiguration region configured to support a VNF and ii) a common region connected to the plurality of programmable regions to support interconnect and shared resources for the plurality of programmable regions; and
circuitry adapted to cause activation of a new VNF service chain, wherein the activation includes a Make-Before-Break (MBB) operation in a network which creates the new VNF service chain based on the VNF service chain optimization and switches the first VNF service chain to the new VNF service chain after the new VNF service chain is established to minimize service interruption over the VNF service chains.

9. The apparatus of claim 8, wherein the lowest cost determination is based on a service chain cost model that assigns costs based on connectivity between switching elements and based on a number of hops.

10. The apparatus of claim 8, wherein the request for VNF service chain optimization is based on one of crossing a bandwidth threshold, a new service, a failure of a VNF in the first VNF service chain, additional applications in the first VNF service chain, and additional VNFs in the first VNF service chain.

11. The apparatus of claim 8, wherein the request for VNF service chain optimization is based on monitoring analytics and performance monitoring where the first VNF service chain exists to determine optimization.

12. The apparatus of claim 8, wherein the request for VNF service chain optimization is to move the at least one VNF from one of the one or more VM elements to the programmable region of one of the one or more HA elements.

13. The apparatus of claim 8, wherein the circuitry adapted to configure comprises programming the programmable region for any functionality comprising packet processing, hardware encryption, Layer 1 framing/muxing, Layer 2 switching, Layer 3 routing, Layer 1 to Layer 2 adaptation, hardware firewall, load balancing, and Layer 1 Forward Error Correction.

14. A server adapted for Virtual Network Function (VNF) service chain optimization, the server comprising:
a network interface in communication with a first VNF service chain having a plurality of VNFs, the first VNF service chain configured as a hybrid service chain including one or more Hardware Acceleration (HA) elements and one or more Virtual Machine (VM) elements, the first VNF service chain further including an application server hosted on one of the one or more VM elements, wherein the one or more HA elements are configured to perform functions faster than the one or more VM elements operating on general purpose processors;
a processor; and
memory storing instructions that, when executed, cause the processor to
responsive to a request for VNF service chain optimization in the first VNF service chain and responsive to a request for an additional application server in the first VNF service chain determine placement for one or more of the plurality of VNFs within the first VNF service chain based on a lowest cost determination, wherein the placement includes locating at least one VNF in the one or more HA elements, and wherein the at least one VNF in the one or more HA elements is configured to perform one or more functions of operating at a line rate, performing routing, and performing switching,
responsive to determining the placement for the one or more VNFs, configure a programmable region of the one or more HA elements for at least one VNF, wherein the one or more HA elements include i) a plurality of programmable regions each being a partial reconfiguration region configured to support a VNF and ii) a common region connected to the plurality of programmable regions to support interconnect and shared resources for the plurality of programmable regions, and
activate a new VNF service chain, wherein the VNF is activated by a Make-Before-Break (MBB) operation in a network which creates the new VNF service chain based on the VNF service chain optimization and switches the first VNF service chain to the new VNF service chain after the new VNF service chain is established to minimize service interruption over the VNF service chains.

15. The server of claim 14, wherein the lowest cost determination is based on a service chain cost model that assigns costs based on connectivity between switching elements and based on a number of hops.

16. The server of claim 14, wherein the request for VNF service chain optimization is based on one of crossing a bandwidth threshold, a new service, a failure of a VNF in the first VNF service chain, additional applications in the first VNF service chain, and additional VNFs in the first VNF service chain.

17. The server of claim 14, wherein the programmable region is configured for any functionality comprising packet processing, hardware encryption, Layer 1 framing/muxing, Layer 2 switching, Layer 3 routing, Layer 1 to Layer 2 adaptation, hardware firewall, load balancing, and Layer 1 Forward Error Correction.

* * * * *